(12) United States Patent
Goldwitz

(10) Patent No.: US 12,709,215 B2
(45) Date of Patent: Aug. 18, 2026

(54) FOLDABLE HARDTOP LIFT AND STORAGE CART

(71) Applicant: Brian Goldwitz, Waterbury, CT (US)

(72) Inventor: Brian Goldwitz, Waterbury, CT (US)

( * ) Notice: Subject to any disclaimer, the term of this patent is extended or adjusted under 35 U.S.C. 154(b) by 0 days.

(21) Appl. No.: 19/271,719

(22) Filed: Jul. 16, 2025

(65) Prior Publication Data

US 2026/0125249 A1 May 7, 2026

Related U.S. Application Data

(60) Provisional application No. 63/717,775, filed on Nov. 7, 2024.

(51) Int. Cl.

*B66F 5/00* (2006.01)
*B60P 7/13* (2006.01)
*B62B 3/10* (2006.01)
*B60J 7/16* (2006.01)

(52) U.S. Cl.

CPC ................ *B60P 7/13* (2013.01); *B62B 3/108* (2013.01); *B66F 5/00* (2013.01); *B60J 7/16* (2013.01)

(58) Field of Classification Search

CPC ...... B66F 5/00; B66F 5/04; B66F 7/00; B62B 3/00; B62B 3/0612

See application file for complete search history.

(56) References Cited

U.S. PATENT DOCUMENTS

| | | | | |
|---|---|---|---|---|
| 2,815,132 | A * | 12/1957 | Stone | B62B 3/108 254/387 |
| 5,975,826 | A * | 11/1999 | Scholder | B66C 23/48 414/490 |
| 6,010,299 | A * | 1/2000 | Jesswein | B66F 5/00 254/8 R |
| 7,448,606 | B1 * | 11/2008 | Johnson | B05B 13/0285 269/16 |
| 10,744,526 | B2 * | 8/2020 | Johnson | B25H 1/00 |
| 2001/0040233 | A1 * | 11/2001 | Chamberlain | B66F 7/02 254/4 R |
| 2010/0102284 | A1 * | 4/2010 | Drake | B66F 7/02 254/1 |
| 2012/0242022 | A1 * | 9/2012 | Gagnon, Jr. | B25B 11/00 269/9 |
| 2024/0294366 | A1 * | 9/2024 | Porricelli | B66F 7/065 |

* cited by examiner

*Primary Examiner* — Lee D Wilson
(74) *Attorney, Agent, or Firm* — Furr Law Firm; Jeffrey M. Furr

(57) ABSTRACT

The current invention is a new design for a foldable hardtop frame lifter and holding cart. It has a wheeled base attached to a lifting embodiment. The base has a plurality of wheels in the preferred embodiment. The device also has a lifting and lowering mechanism which is attached to base and to the lifting embodiment. In one embodiment, the lifting embodiment is a set of adjustable brackets. In other embodiment, the lifting embodiment is a frame with a plurality of clamps that clamp on the sides of the hardtop.

19 Claims, 47 Drawing Sheets

FOLDABLE HARDTOP LIFT AND STORAGE CART

RELATED APPLICATIONS

This application claims the priority date of Provisional Application 63/717,775 filed on Nov. 7, 2024.

TECHNICAL FIELD

The technology discussed below relates a hardtop lift and more particularly making it as a cart and foldable.

BACKGROUND

Many people who enjoy outdoor activities own sport utility vehicles (SUVs) with hardtops that can be removed in order to give occupants more pleasure while riding in the vehicle. The hardtops, need to be carefully removed, and once removed, need to be stored in appropriate fashion in order to prevent damage to them. As such hardtops are relatively bulky and heavy, such lifting and storage is not an easy task. Laying the hardtops on a ground surface is not satisfactory as that can cause damage to the hardtop, especially to its finish. Therefore, some devices are available for storing the hardtops, but such devices do not offer any purpose beyond this singular purpose and are not otherwise of particular utility when not serving in their intended purpose and are they themselves relatively large and bulky.

What is needed is a device that is designed to easily and effectively lift and hold a vehicle hardtop or hard top that is removed from the vehicle so as to prevent the hardtop or hard top from becoming damaged or removing the hard top for an open feeling. Such devices must be able to easily move about the ground level when the hardtops or hard top are being held by the devices. Such a device must have substantial utility beyond the task of holding and moving vehicle hardtops or hard top about so that the device is multipurpose in its functioning. Such a device must provide support for a variety of articles as defined by the users'needs and also be relatively small and compact when not in use for ease of storage or transport of the device.

There is still room for improvement in the art.

SUMMARY

The current invention is a new device to lift and removed hardtops and can be used to hold removed hardtops from a jeep or SUV in a new and novel way.

The current invention is a new design for a foldable hardtop frame lifter and holding cart. It has a wheeled base attached to a lifting embodiment. The base has a plurality of wheels in the preferred embodiment. The device also has a lifting and lowering mechanism which is attached to base and to the lifting embodiment. In one embodiment, the lifting embodiment is a set of adjustable brackets. In other embodiment, the lifting embodiment is a frame with a plurality of clamps that clamp on the sides of the hardtop. In another embodiment, the lifting embodiment is an angled bracket. In another embodiment, the lifting embodiment is a straight bracket.

These are improvements over the current art.

DETAILED DESCRIPTION

Figure 1:
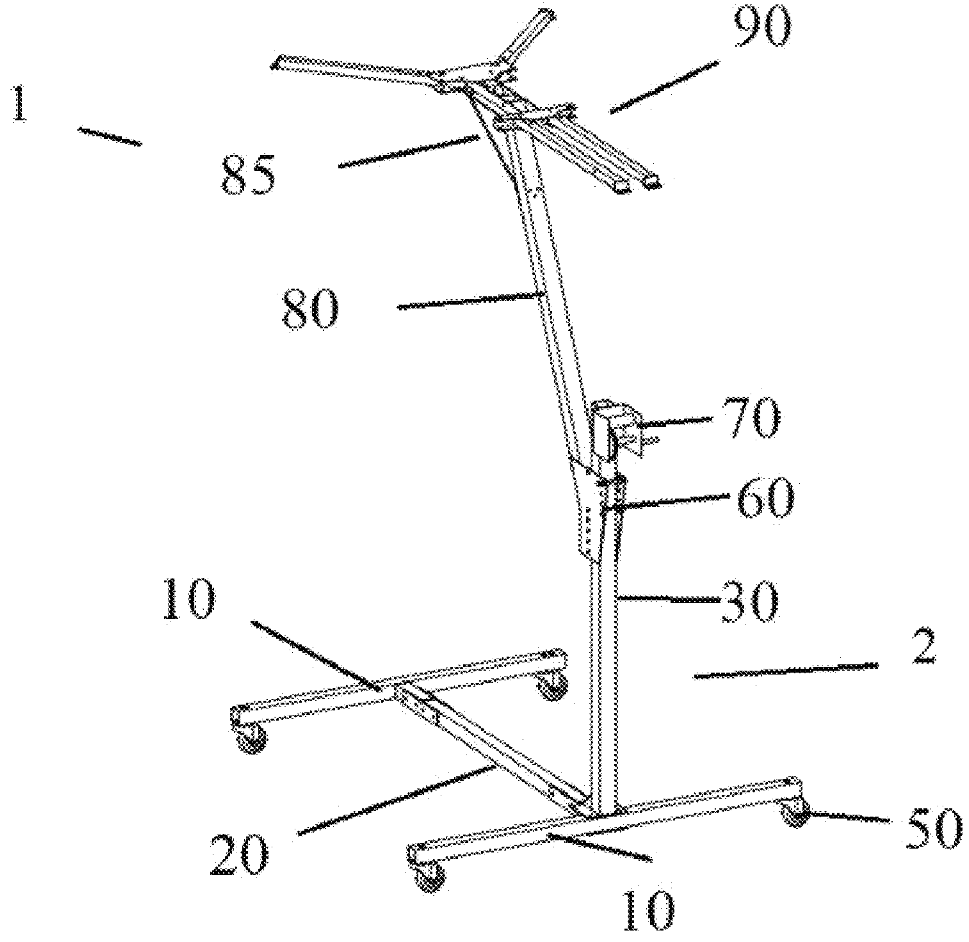
FIG. 1 is a display of one embodiment of a hardtop lifter with extendable bars.

The illustrations presented herein are, in some instances, not actual views of any particular framing devices or components thereof but may be idealized representations which are employed to describe the present disclosure. Additionally, elements common between figures may retain the same numerical designation.

FIGS. 1 through 46 shows the current invention is a new design for a foldable hardtop frame lifter and holding cart 1. It has a wheeled base attached to a lifting embodiment. The base has a plurality of wheels 50 in the preferred embodiment. The device 1 also has a lifting and lowering mechanism 70 which is attached to base 2 and to the lifting embodiment. In one embodiment, the lifting embodiment is a set of adjustable brackets. In other embodiment, the lifting embodiment is a frame with a plurality of clamps that clamp on the sides of the hardtop.

FIG. 1 shows an embodiment of the device 1 which is a foldable hardtop lifter and storage cart. The device 1 has a base 2 and a lifting platform.

In the preferred embodiment, the base 2 has a plurality of base support bars 10 that are attached by support cross bar 20. The base support bars 10 may have a plurality of wheels 50 attached to the bottom and evenly spaced in the preferred embodiment.

A support pole 30 extends perpendicular from one of the base support bars 10. A lift bracket 60 is attached to the support pole 30 and can be moved up and down the support pole 30.

Figure 10:
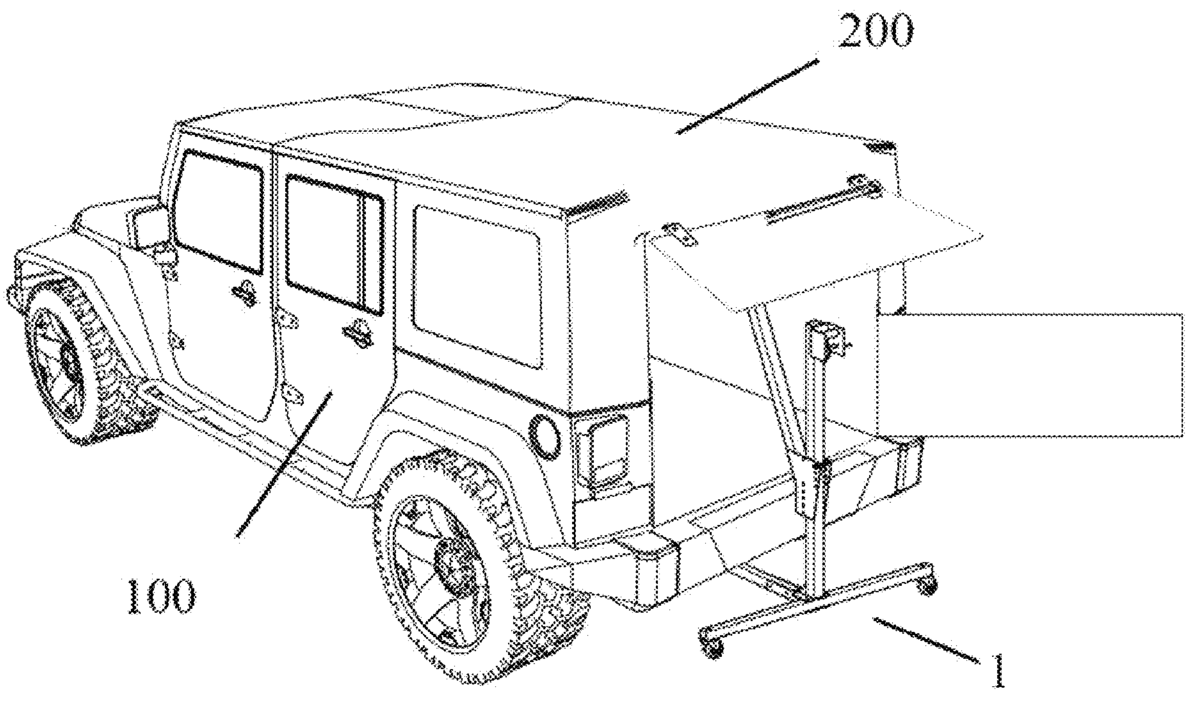
FIG. 10 shows the hardtop lifter being used to lift a hardtop.
Figure 11:
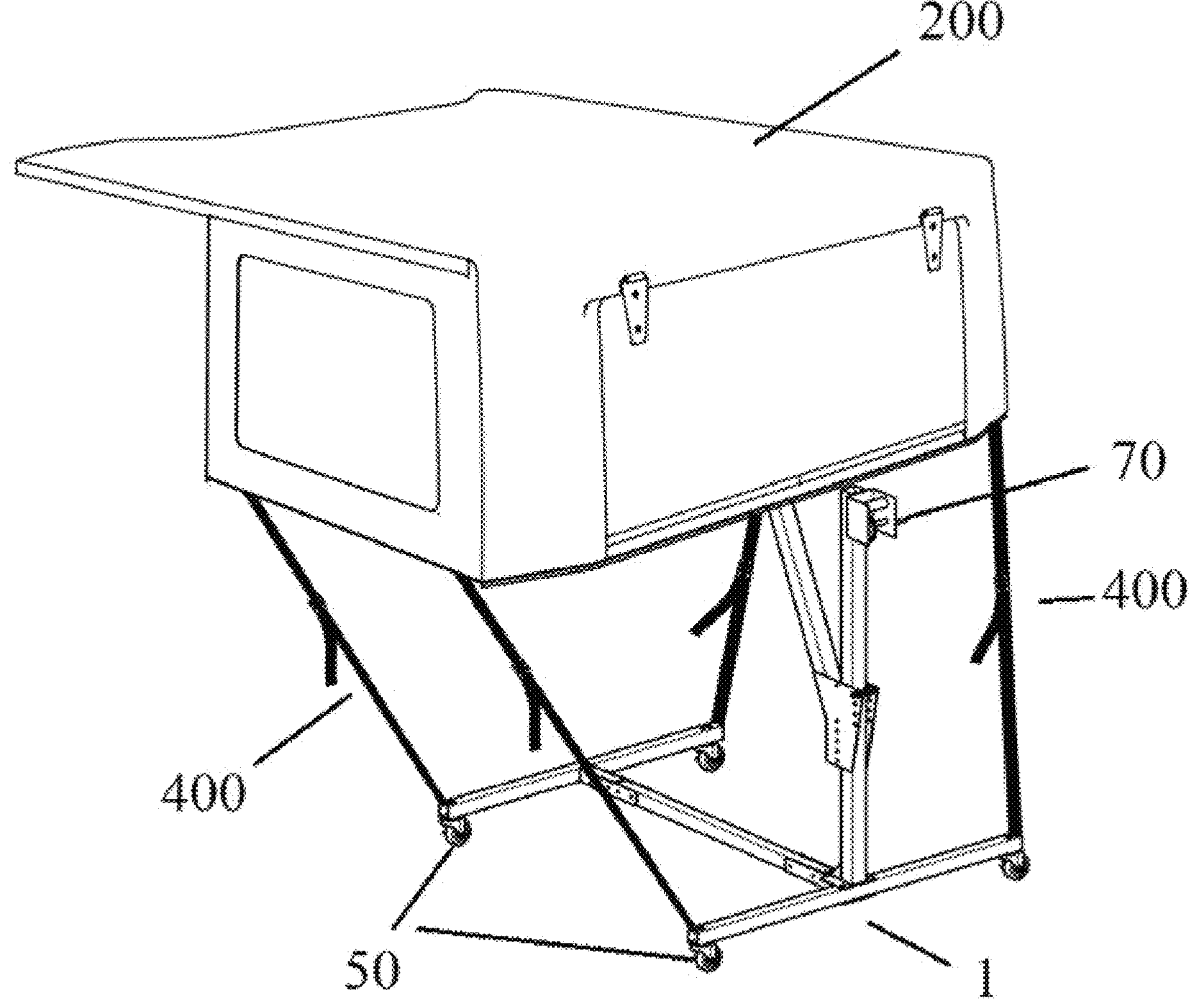
FIG. 11 shows a hardtop being stored on the hardtop lifter.

The lift bracket 60 is attached to a lift means 70. The lift means 70 can be a crank and pulley system with a cable attached to the lift bracket 60 or an electronic motor or hydraulic system. The lift means 70 lifts and lowers the lift bracket 60 up and down the support pole 30 allowing the user to lift the hardtop 200 up and off the vehicle 100 as shown in FIGS. 10 and 11.

It the preferred embodiment, the lift means 70 is positioned on the top of the support pole 30. A support bar 80 extends up from the lift bracket 60 to the hardtop bracket 90 holding and supporting the hardtop bracket 90. The support bar 80 is positioned above the base parallel with the support cross bar 20 to much sure that the foldable hardtop lifter and storage cart 1 is stable with the load of the hardtop 200.

An angled control bar 85 attaches from the front of the support bar 80 to the front bottom of the lift bracket 90. This connection can pivot. This angled control bar 85 can be moved or removed to change the angle of the lift bracket 90. This allows the lift bracket 90 to adjust the of the hardtop bracket 90 when it is holding a hardtop 200.

Figure 2:
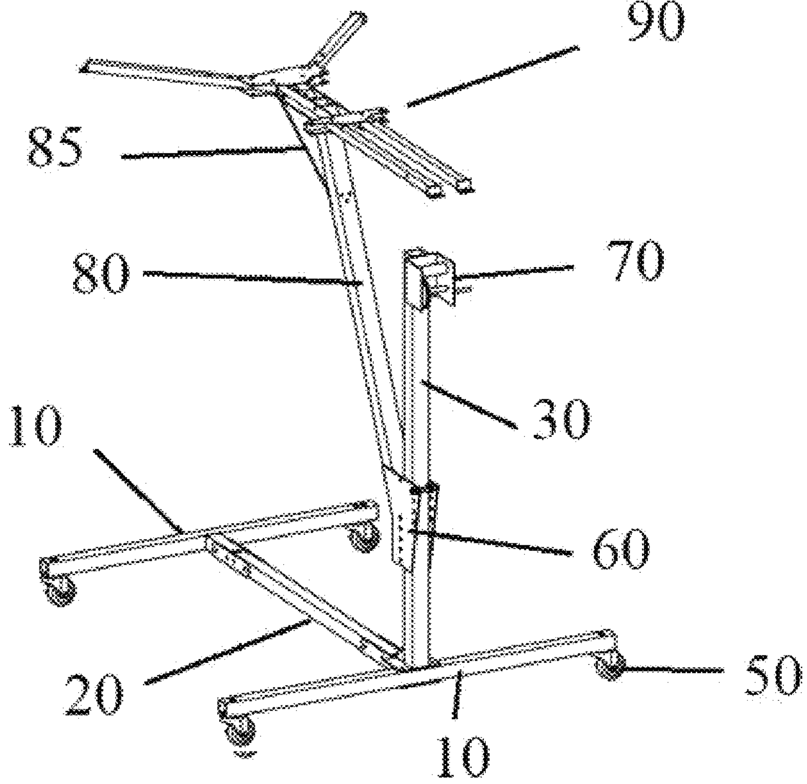
FIG. 2 shows the embodiment under FIG. 2 with the holding bars being lowered.
Figure 3:
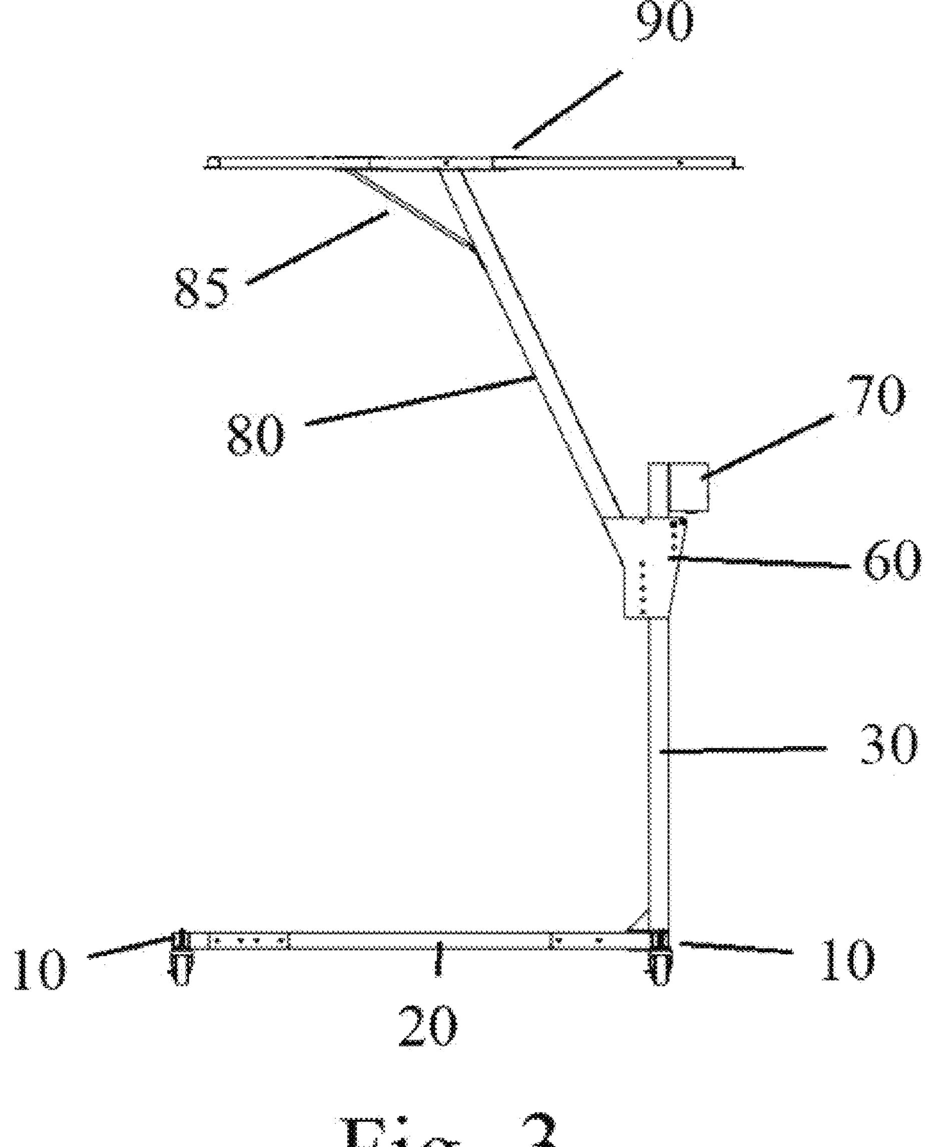
FIG. 3 shows a side view of the hardtop lifter.

FIG. 2 shows the lift bracket 60 being lowered down on the support pole 30. FIG. 3 shows a side view of the foldable hardtop lifter and storage cart 1 with the lift bracket 60 positioned at the top of the support pole 30.

Figure 4:
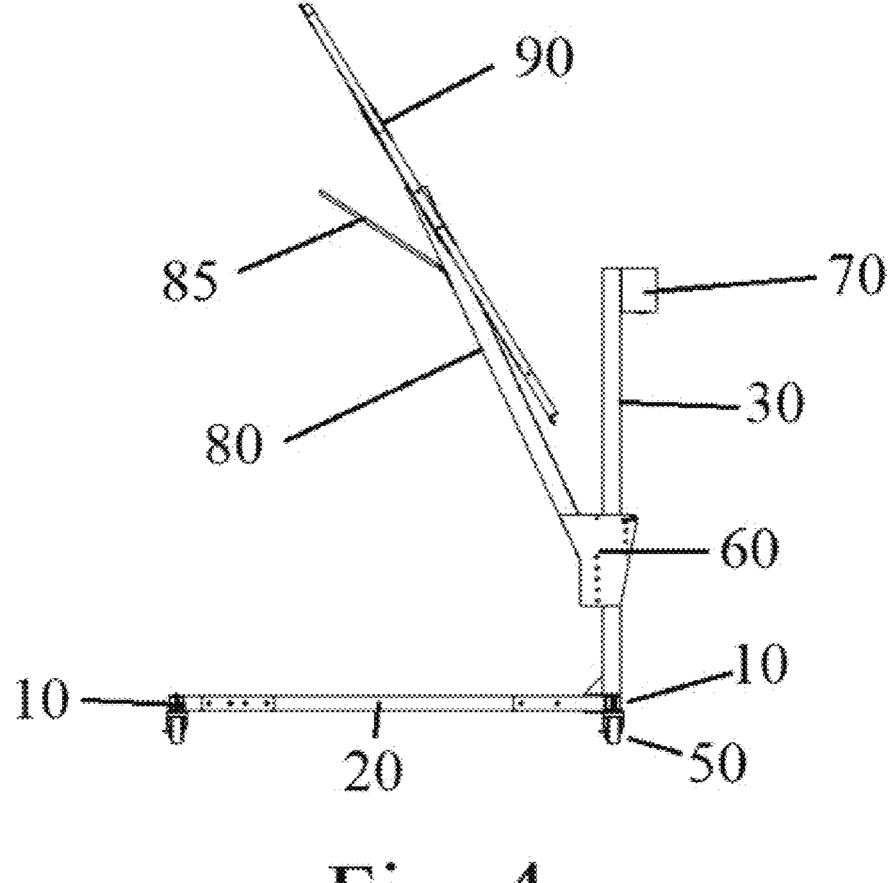
FIG. 4 shows the holding bars positioned at an angle.

FIG. 4 shows the lift bracket 60 lowered on the support pole 30 using a lift means 70. The hardtop bracket 90 pivots on the support bar 80 into a potential storage or folded position. The angled control bar 85 releases its connection from the hardtop bracket 90 as the hardtop bracket 90 is repositioned and pivoted to the storage or folded position where it is almost parallel with the support bar 80.

Figure 5:
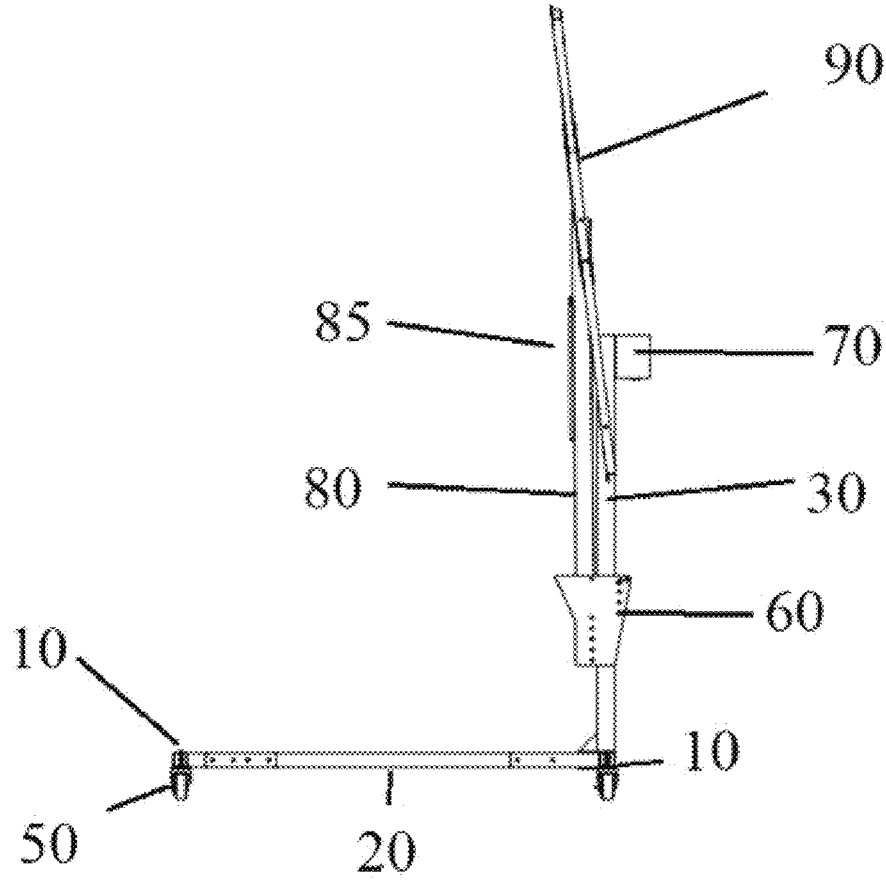
FIG. 5 shows the holding bars positioned perpendicularly.

FIG. 5 shows the hardtop bracket 90 pivots on the support bar 80 into a folded position. The angled control bar 85 releases its connection from the hardtop bracket 90 and pivots so it is flat against the support pole 30. The lift bracket as the hardtop bracket 90 is repositioned in a lower position on the support pole 30. The support bar 80 is pivoted up so that is against the support pole 30. As in FIG. 4, the hardtop bracket 90 is pivoted where it is almost parallel with the support bar 80 as well as perpendicularly to the base 2.

Figure 6:
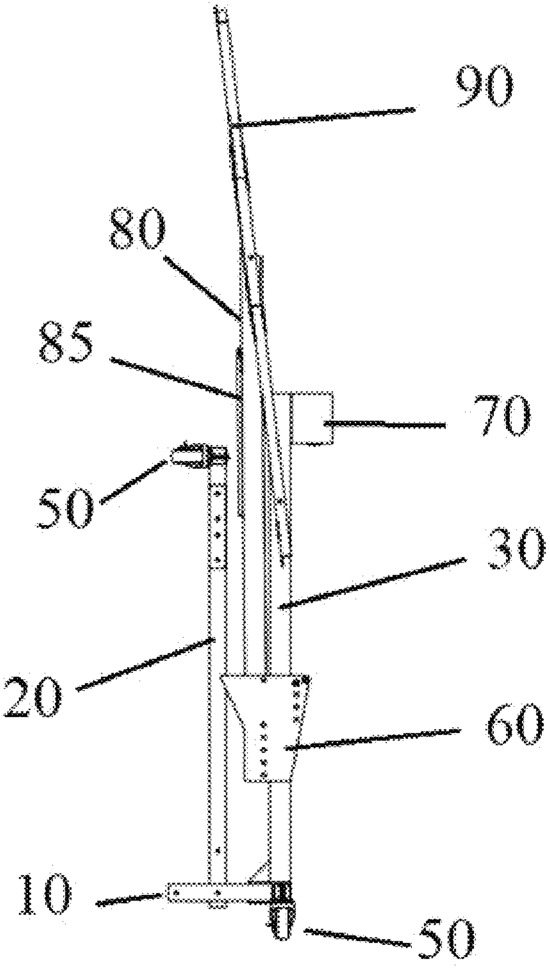
FIG. 6 shows the hardtop lifter in a folded position.
Figure 7:
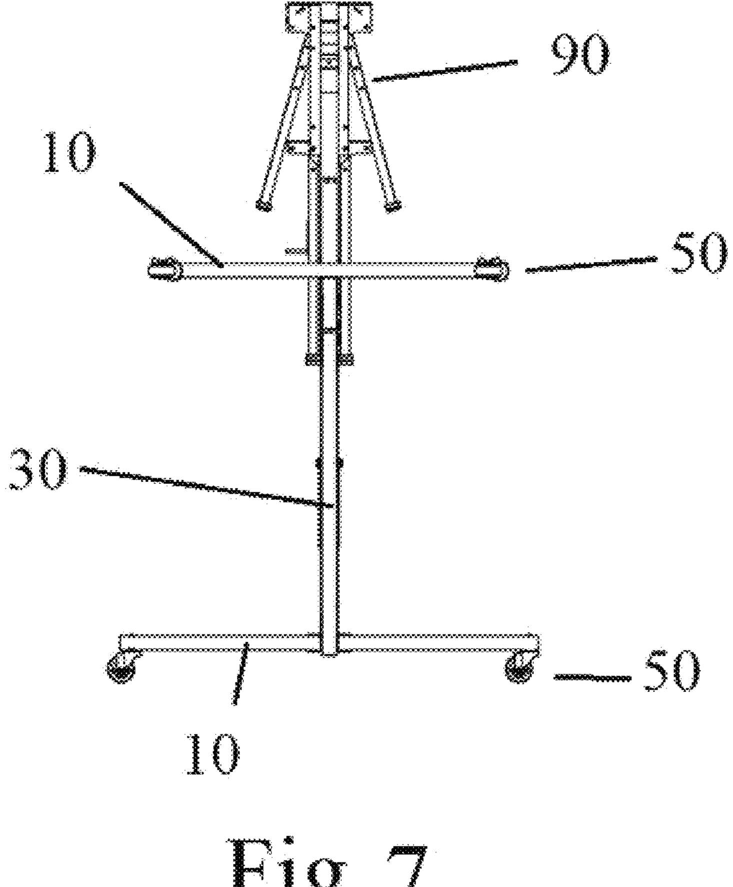
FIG. 7 shows a top view of the hardtop lifter.

FIG. 6 shows the hardtop lifter 1 in a folded position. In addition to the positioning of the support 80 pivoting against the support pole 30 and the hardtop bracket 90 being pivoted up as shown in FIG. 5. The support cross bar 20 is folded up on a hinge that connects it to the back base support bar 10 that are attached by support cross bar 20. FIG. 7 shows a front view of the hardtop lifter 70 in a folded position. The back base support bar 10 wheels assists in the moving of the folded hardtop lifter 1. The front base support bar 10 which is attached to the front of the support cross bar 20. The wheels 50 of the front base support bar 10 can be used when the hardtop lifter 1 is stored on its side to support and assist the movement of the folded hardtop lifter 1 when its on its side.

Figure 8:
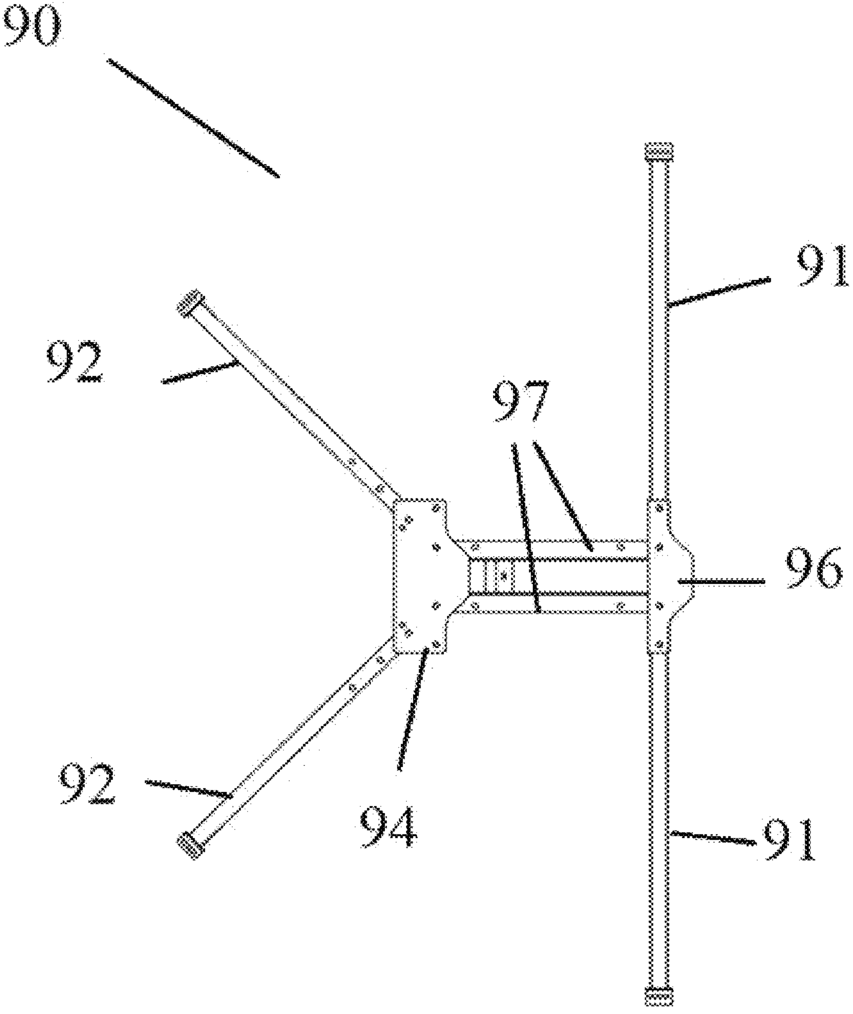
FIG. 8 shows the holding brackets.
Figure 9:
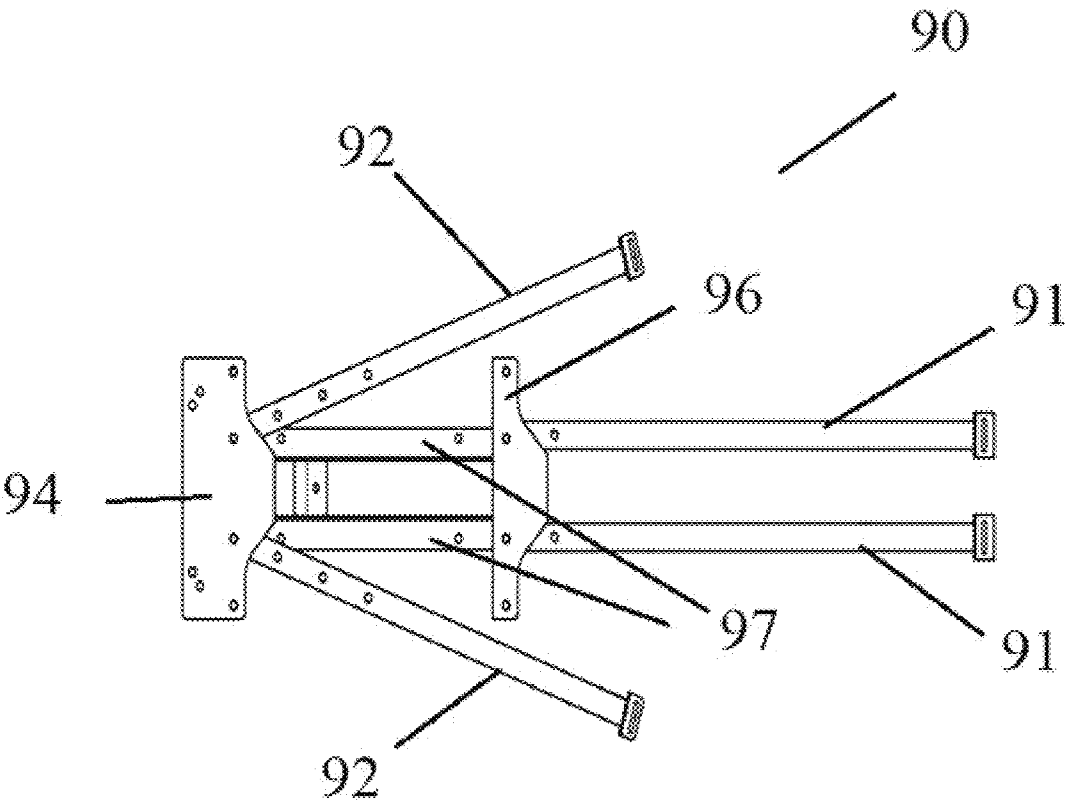
FIG. 9 shows folded holding brackets.

FIG. 8 shows a top view of one embodiment of the hardtop bracket 90 in an expanded foldable configuration. The hardtop bracket 90 has extendable configuration so that it can properly hold the hardtop 200 while it is being lifted off the vehicle 100 and stored as shown in FIGS. 10 and 11. This embodiment has a broad base to secure the hardtop 200. It has a front bracket 96 which is attached to a back bracket 94 by a plurality of parallel bracket connection bars 97. In this embodiment, there are two front bars 91 that extends out from the sides of the front bracket 96. There are two back bars 92 that extends out from the back of the back bracket 94. The back bars 92 extend out at an angle increasing the stability and support of the hard top 200. FIG. 9 shows the holding bracket 90 in a folded position. The two front bars 91 are pivoted to a position that are parallel to the parallel bracket connection bars 97 and the two back bars 92 are pivoted towards the front bracket 96 putting the holding bracket 90 into a folded position.

FIG. 10 shows the hardtop lifter 1 being used to lift a hardtop 200. FIG. 11 shows a hardtop being stored on the hardtop lifter 1.

FIGS. 12 through 23 show another embodiment of the "H" shaped hardtop bracket.

The "H" shaped bracket is comprised of a central bar 115 connected to the extender bar 99 with a pivotal connection 190 which allows the central bar 115 to swivel allowing flexibility in the positioning of the bracket to allow the best position to lift the hardtop 200 from the vehicle 100. Two lift support bars 110 are connected and are perpendicular to the central bar 115.

Figure 14:
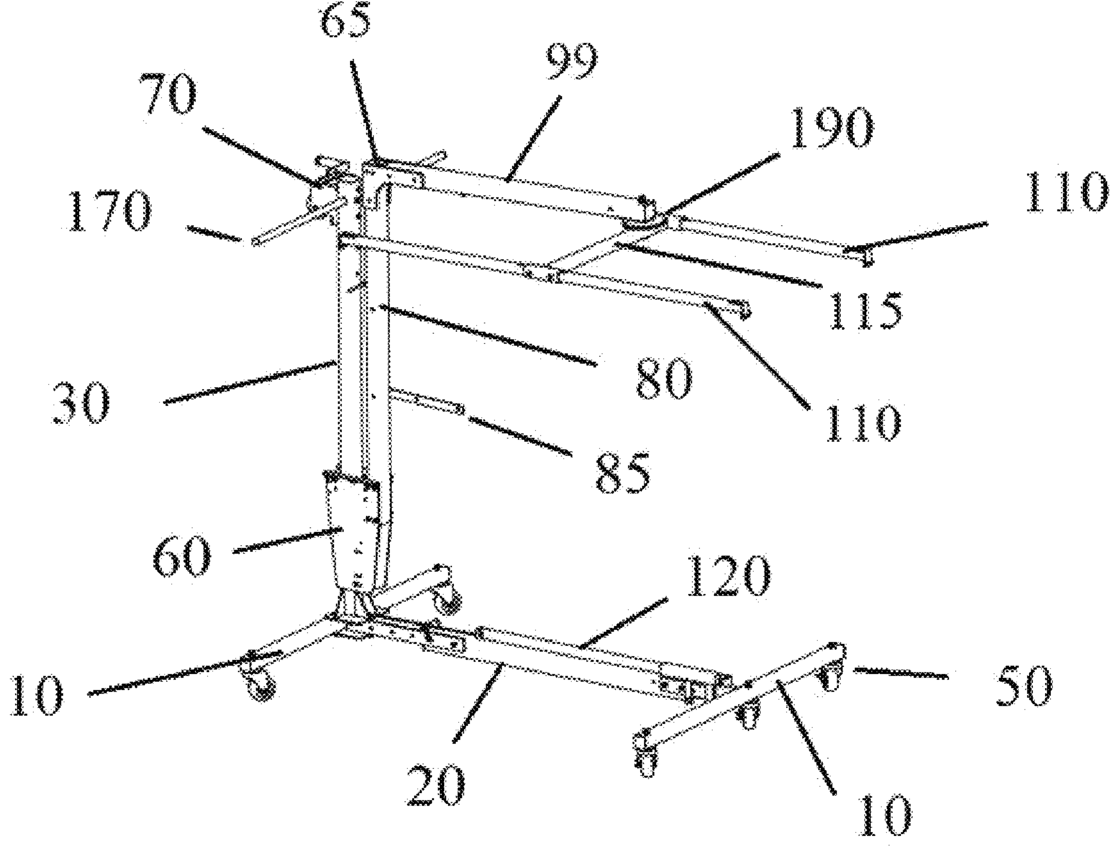
FIG. 14 shows a folded view of another embodiment of the hardtop lifter.
Figure 15:
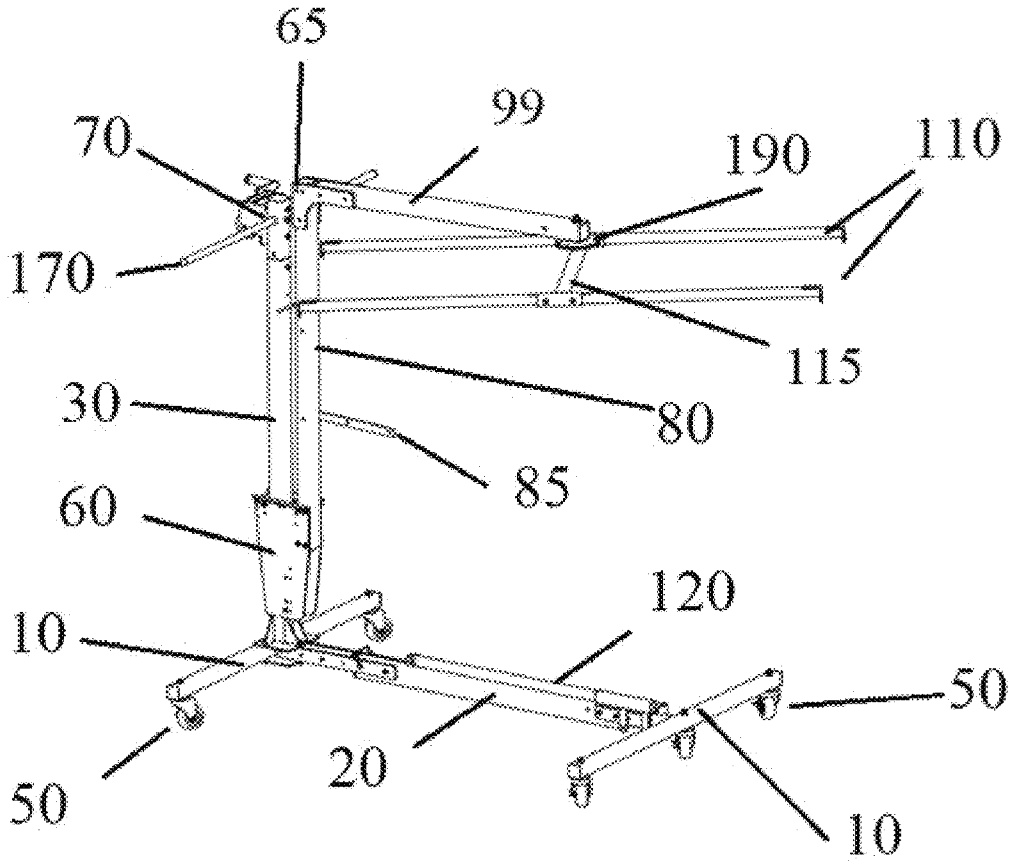
FIG. 15 shows a side view with the lifting mechanism folded.

The central bar 115 is attached to the extender bar 99. The back of the extender bar 99 is connected to and extends forward from the top of the support bar 80 with a support bar bracket 65. The central bar 115 is connected to a hinge or swivel connection 190 at the front of the extender bar 99. That the end of the central bar 115 are lift support bars 110 that run perpendicular to the central bar 115. FIG. 14 shows the "H" bracket where the cross bar 115 is perpendicular to the extender bar 99. FIG. 15 shows a side view with the "H" bracket swiveled.

Figure 16:
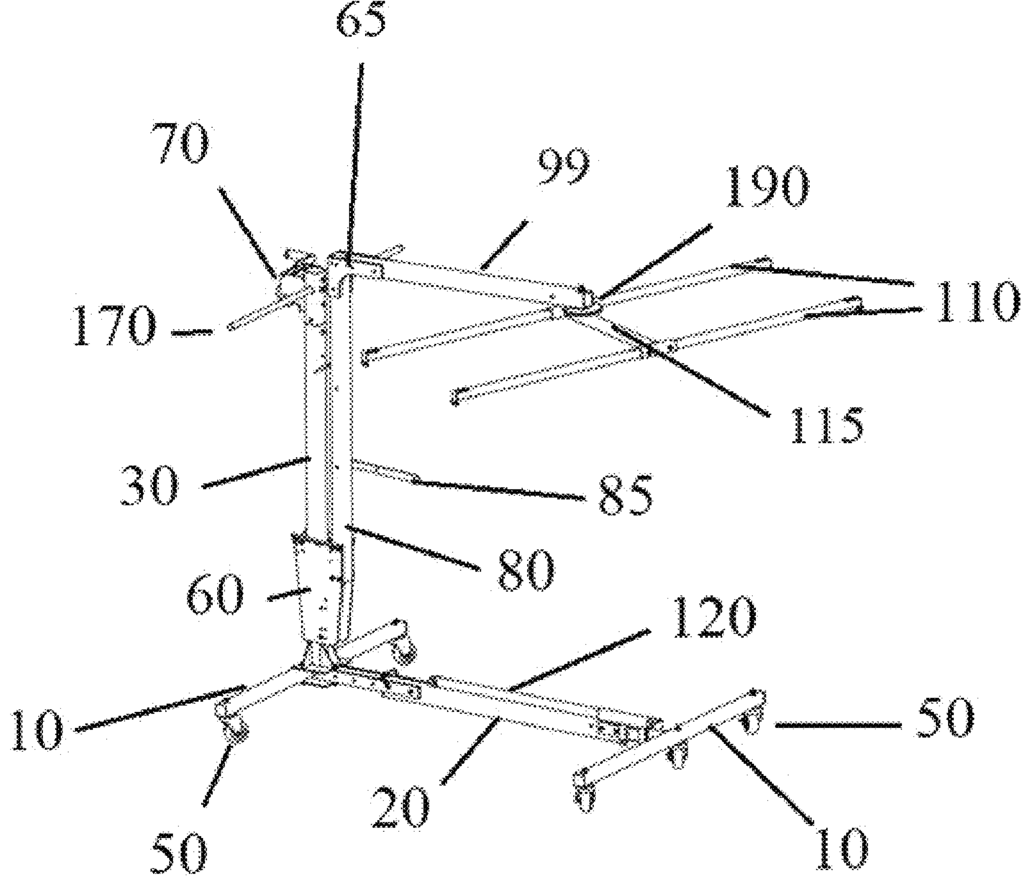
FIG. 16 shows another view of the lifting mechanism.
Figure 17:
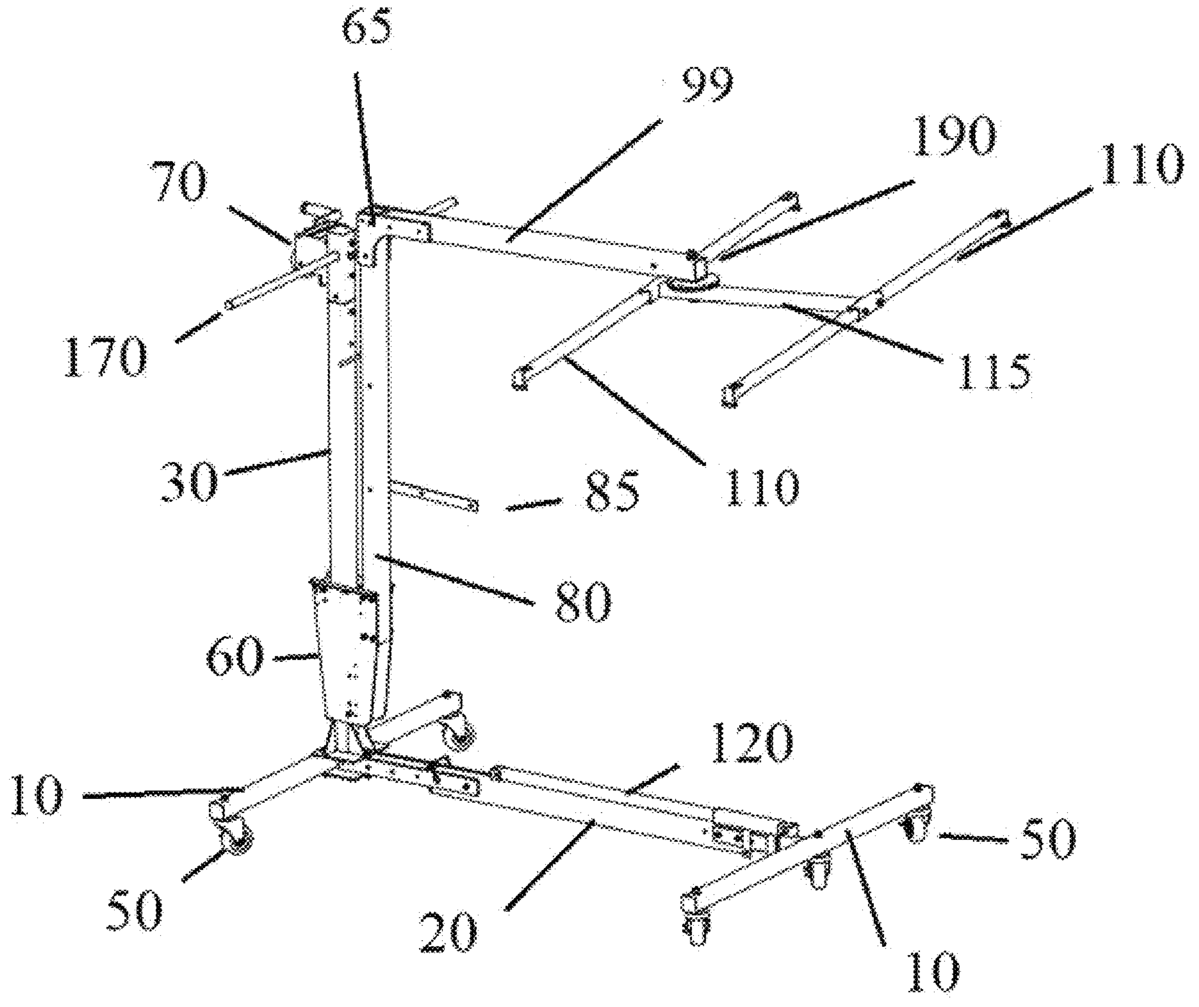
FIG. 17 shows the hardtop lifter with the "H" brackets extended.
Figure 18:
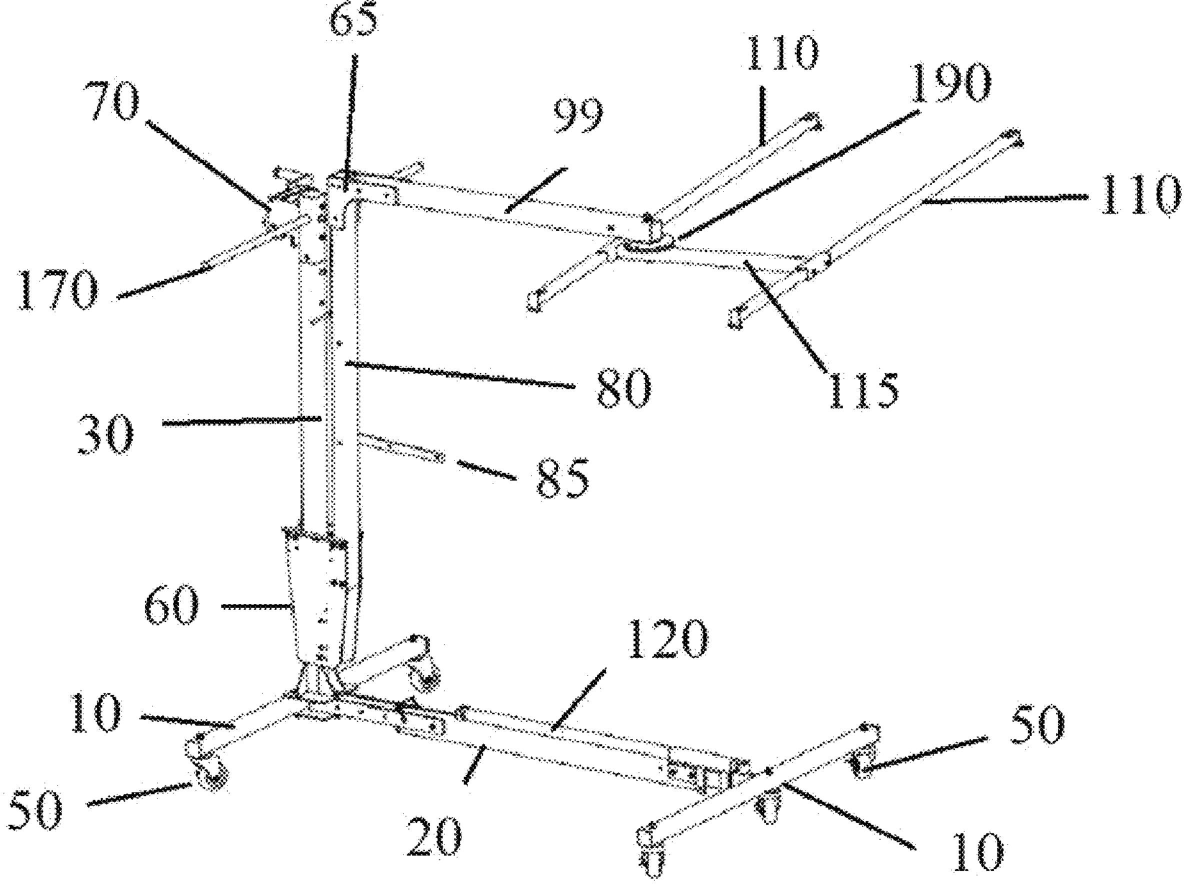
FIG. 18 shows the hardtop lifter with the "H" brackets angled.

FIG. 16 shows a side view with the "H" bracket swiveled so that the "H" bracket is almost perpendicular to the central bar 115. FIG. 17 shows the hardtop lifter 1 with the "H" brackets extended perpendicular to the central bar 115. FIG. 18 shows the hardtop lifter 1 with the "H" brackets angled.

Figure 19:
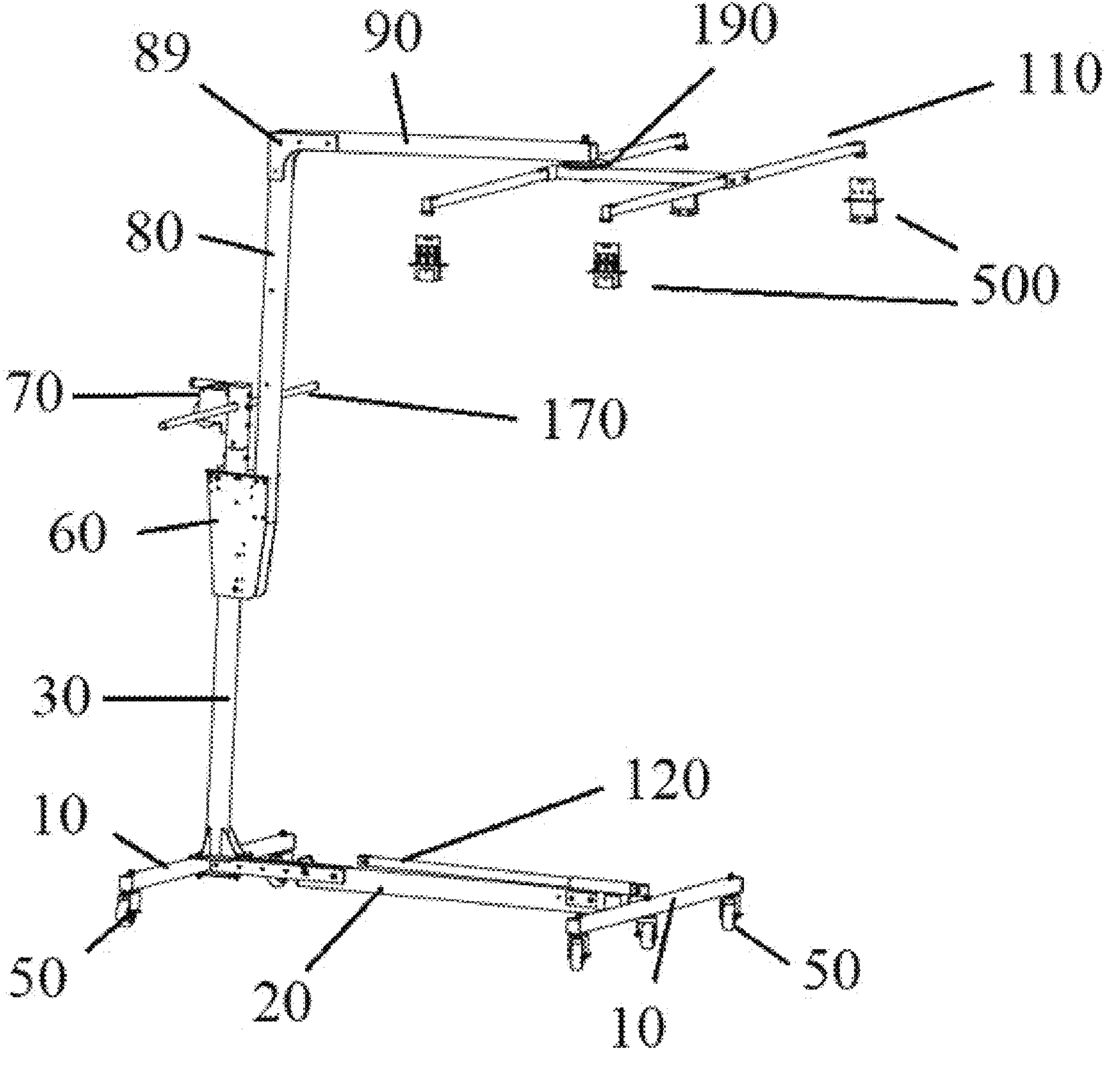
FIG. 19 shows the hardtop lifter with the "H" brackets with clamps.

As shown in FIG. 19, in the preferred embodiment, shows the hardtop lifter with the "H" brackets with clamps 500 at the ends of the lift support bars 110. The lift support bars can have a plurality of clamps 500 that are connected to and head down from the lift support bars 110. In the preferred embodiment, each lift support bar 110 will have a clamp 500 on each end of the lift support bar 110. In FIG. 19, the shows the lift bracket 60 being lifted up on the support pole 30.

Figure 20A:
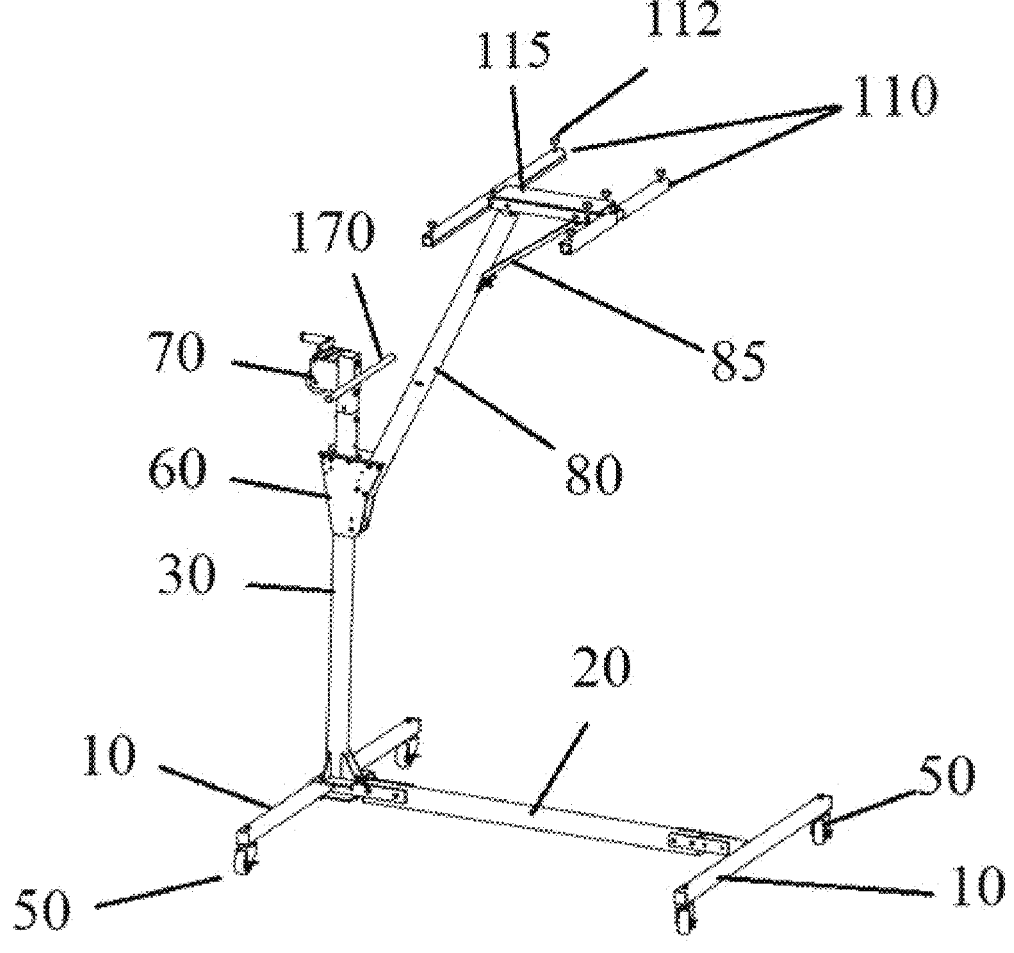
FIGS. 20A and 20B shows other embodiments of the hardtop lifter with the "H" brackets.
Figure 20B:
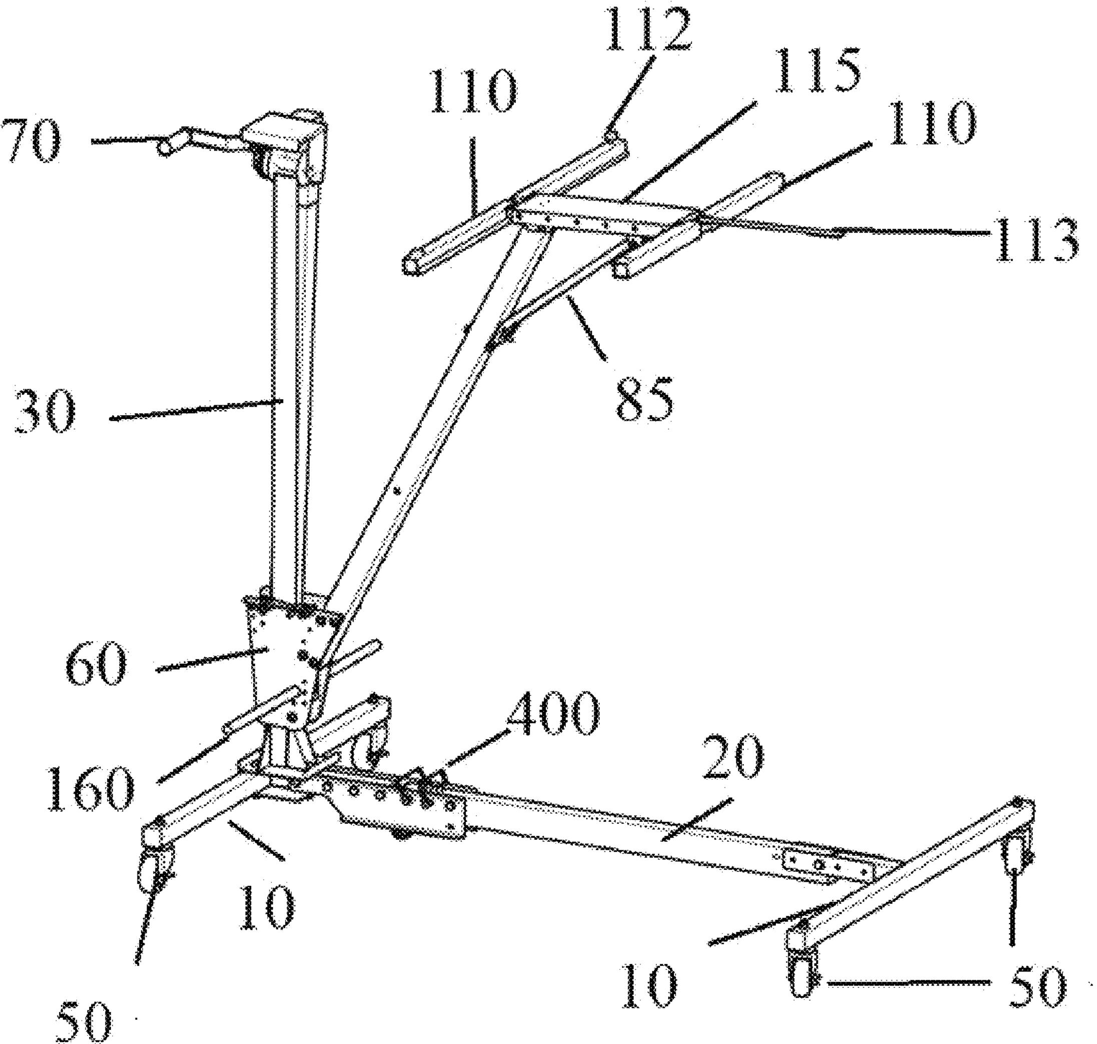
Figure 21A:
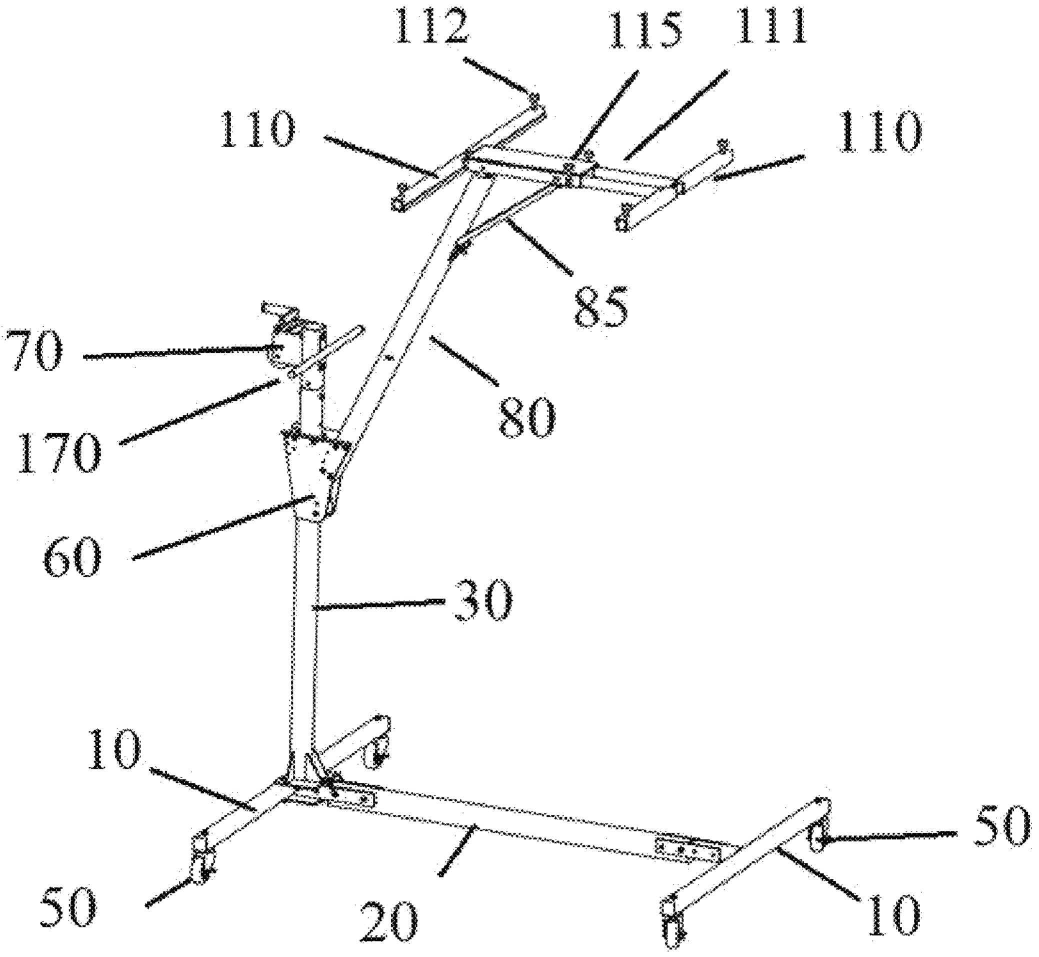
FIG. 21A shows another view of the hardtop lifter with the "H" brackets extended.
Figure 21B:
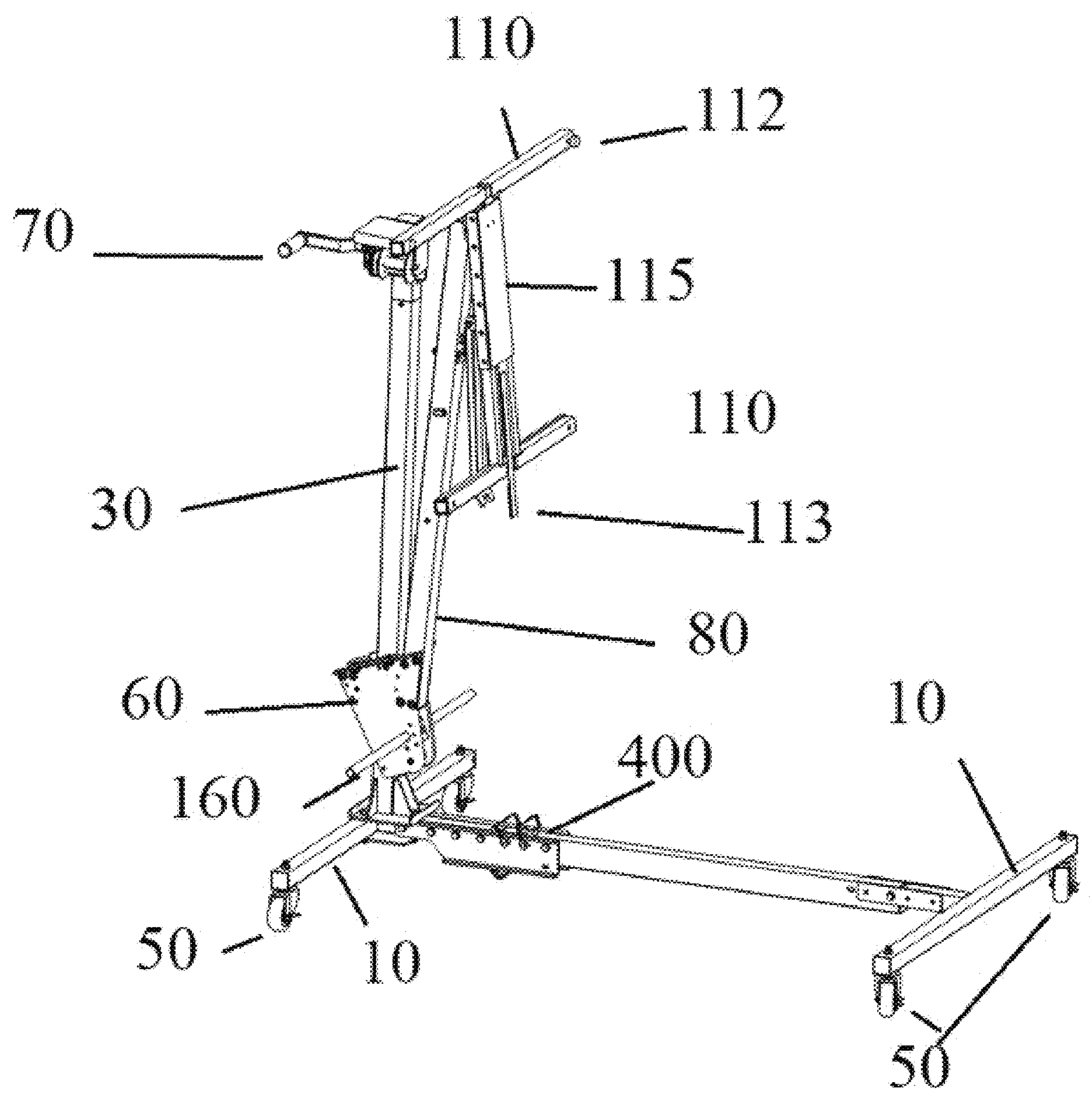
FIG. 21B shows another view of the hardtop lifter with the "H" brackets extended in a folded position.
Figure 21C:
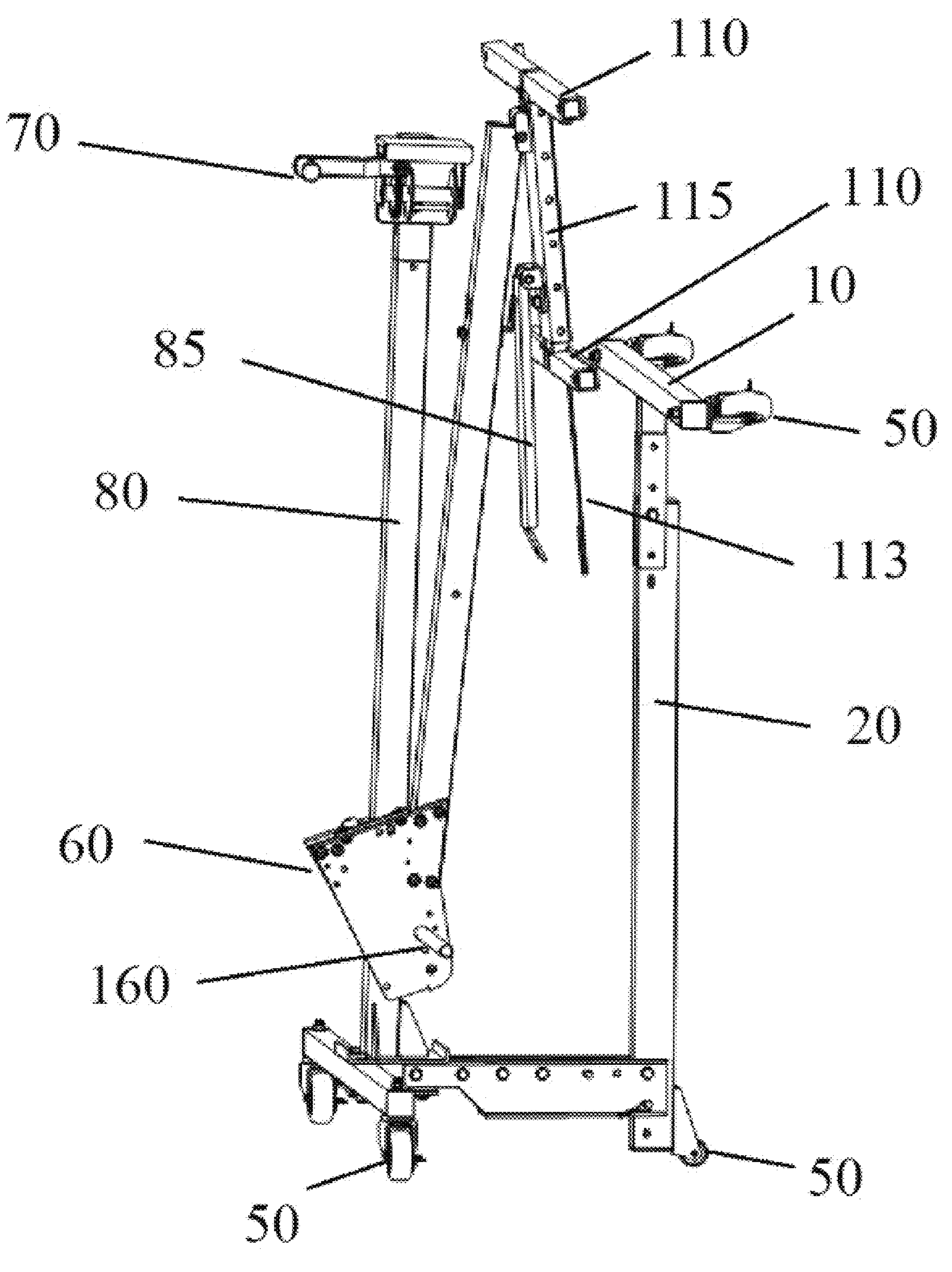
FIG. 21C shows the hardtop lifter embodiment in a folded position.

FIG. 20A shows another view of the hardtop lifter with the "H" brackets where the support bar 80 is angled out over the base 2 with the angled control bar 85 connected to the "H" bracket without have a support bar bracket 65 or extension bar 99. FIG. 20B shows the embodiment with a central bar extender 113 that extends in front of the central bar 115. This embodiment the "H" bracket is positioned below the hardtop 200 and lifts it up for removal and storage. While FIG. 21A shows the hardtop lifter 1 where the cross bar 115 can be extended out. FIG. 21B shows this hardtop lifter 1 embodiment moving into a folded position with the central bar 115 is folded down next to the support bar 80. FIG. 21C shows this hardtop lifter 1 embodiment in a folded position. In addition to the positioning of the support bar 80 pivoting against the support pole 30, the central bar 115 is folded down next to the support bar 80 with the lift support bar 110 folded against the central bar 115. A hinge that connects it to the back base support bar 10 are attached by up against the support bar 80. The back base support bar 10 wheels assists in the moving of the folded hardtop lifter 1. The front base support bar 10 which is attached to the front of the support cross bar 20. The wheels 50 of the front base support bar 10 can be used when the hardtop lifter 1 is stored on its side to support and assist the movement of the folded hardtop lifter 1 when its on its side. The angled control bar 85 can be used to hold the support 80 in its folded position. FIG. 21C shows an embodiment with a wheel 50 on the bottom of the cross bar 20 which can be used to move the hardtop lifter 1 when it is in a folded position.

Figure 12:
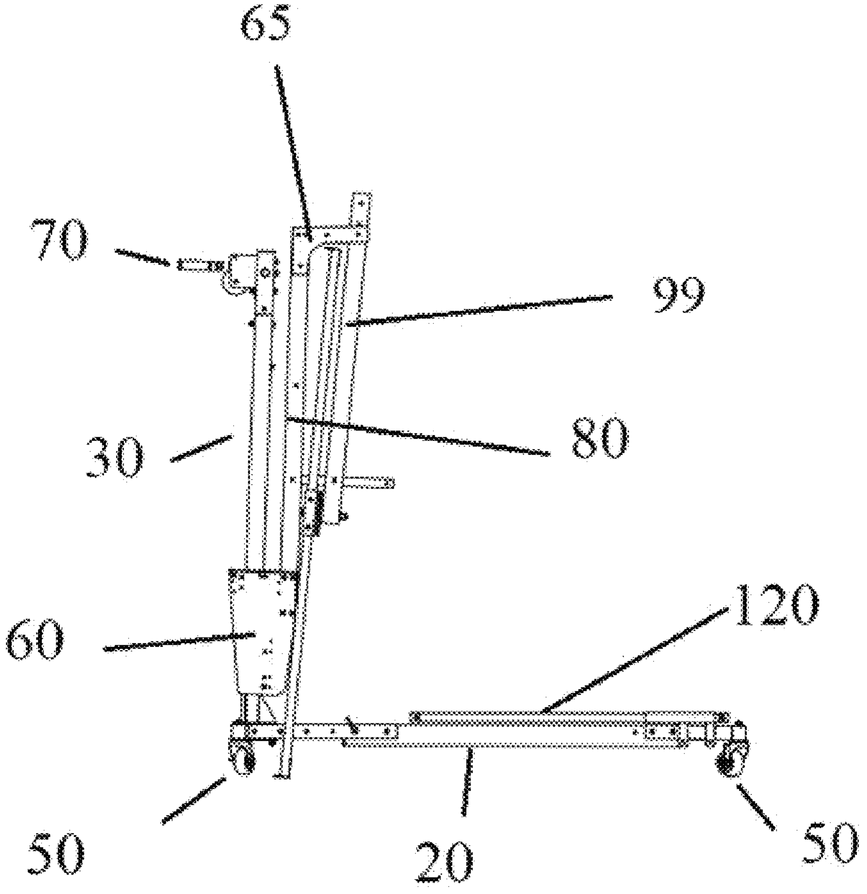
FIG. 12 shows the hardtop lifter with the lifting brackets being folded.
Figure 13:
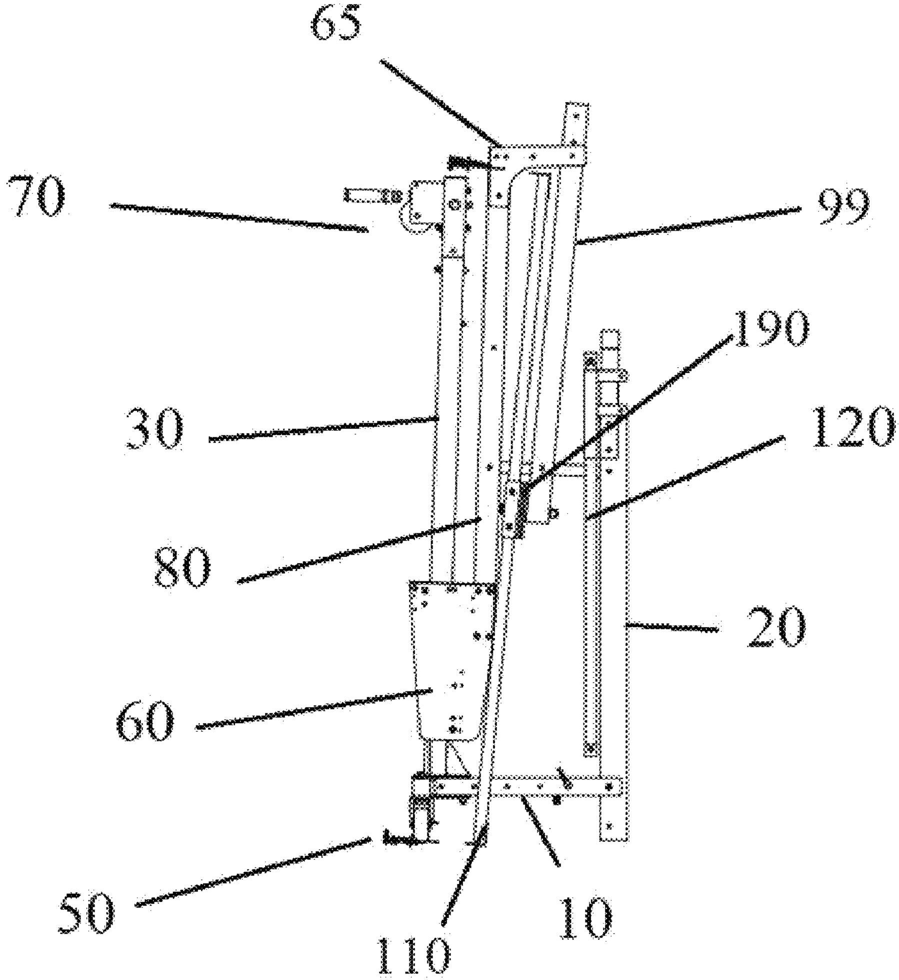
FIG. 13 shows a folded view of the hardtop lifter
Figure 24:
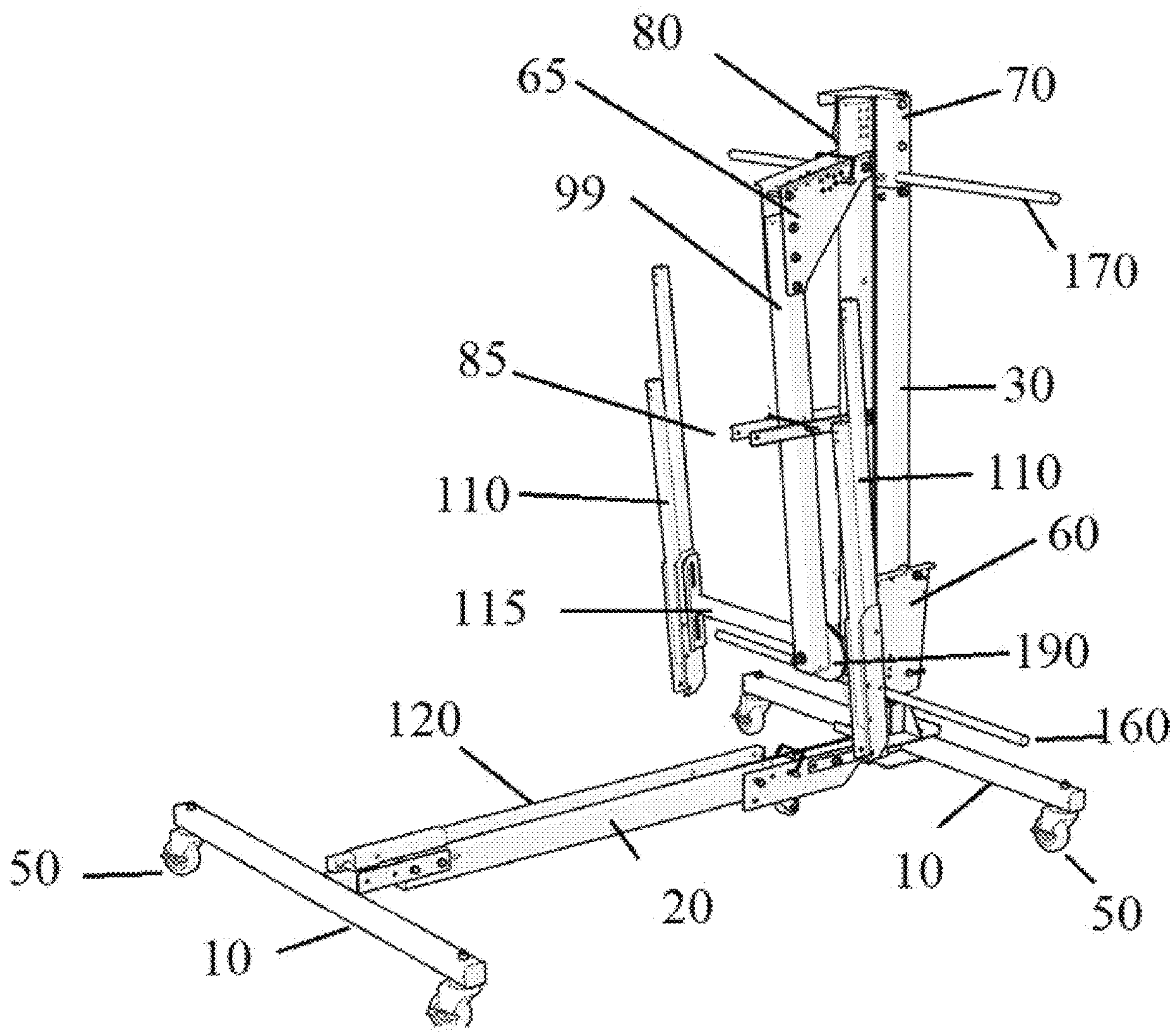
FIG. 24 shows the "H" bracket folded down.

FIG. 24 shows the "H" bracket folded down so that this embodiment of the hardtop lifter can be folded. The bracket connection bar 99 is pivoted down with the support bar bracket 95 against the support bar 80. The lift support bars 110 has one half being folded up. FIG. 24 shows the hinges in support cross bar 20. FIGS. 12 and 13 show the folded view of this embodiment of the hardtop lifter 1. FIG. 12 is a view before the support cross bar 20 is folded up while FIG. 13 is a view after the support cross bar 20 is in its final folded position.

In the preferred embodiment, the wheels are connected using a pivoting socket allowing the wheels to turn as necessary to allow proper movement of the hardtop lifter.

Figure 22:
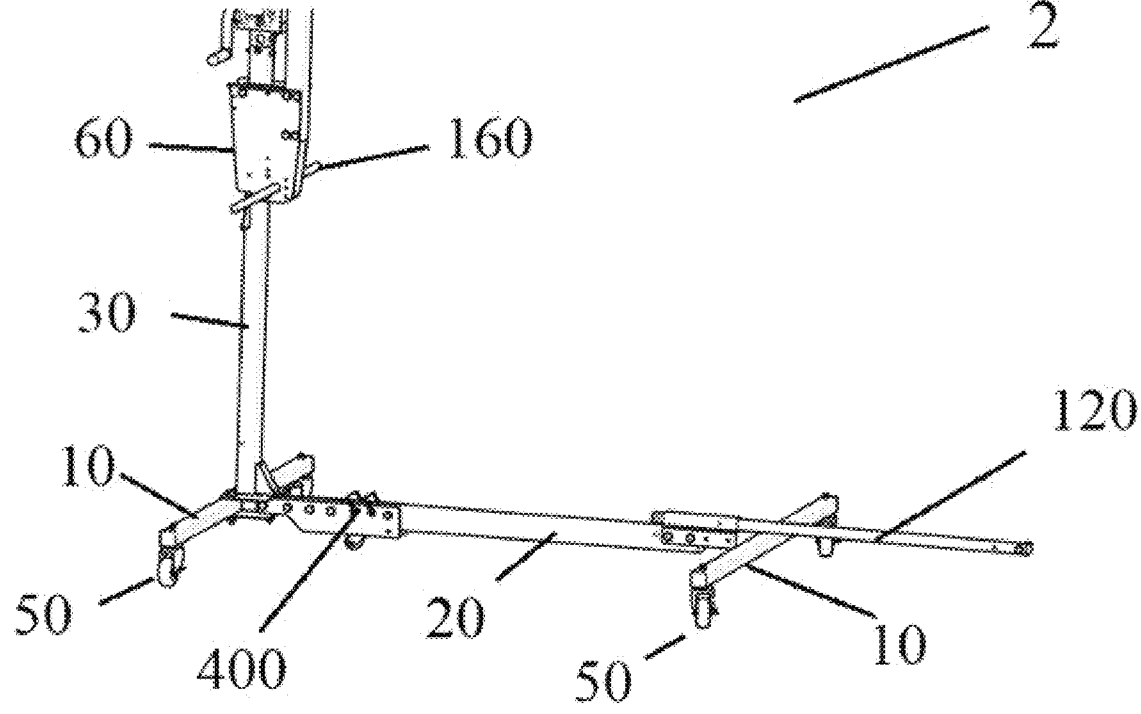
FIG. 22 shows a view of extender bar extended.

FIG. 22 shows a close up view of an embodiment of the base 2. This embodiment show the extending control bar 120. The extending control bar can extend out in front of the base 2. The extending control bar 120 can extend under the vehicle 100 allowing better control of the hardtop lifter 1 as it can be extended out from underneath the vehicle allowing for the hardtop lifter 1 to be adjusted from the other side of the vehicle 100 or even from underneath the vehicle 100. It allows for better control and positioning of the hardtop lifter 1.

Figure 23:
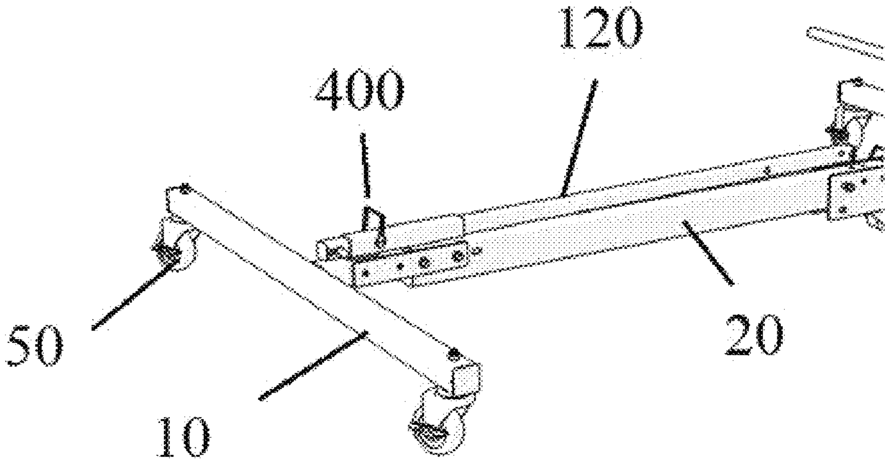
FIG. 23 shows the extender bar in its locked position.

FIG. 23 shows extending control bar 120 in its locked position on top of the support cross bar 20. It is locked in place using a locking pin and compression bracket 400. It expends out in front of the base 2 using a hinge and is locking into place using the locking pin and compression bracket 400.

Figure 25A:
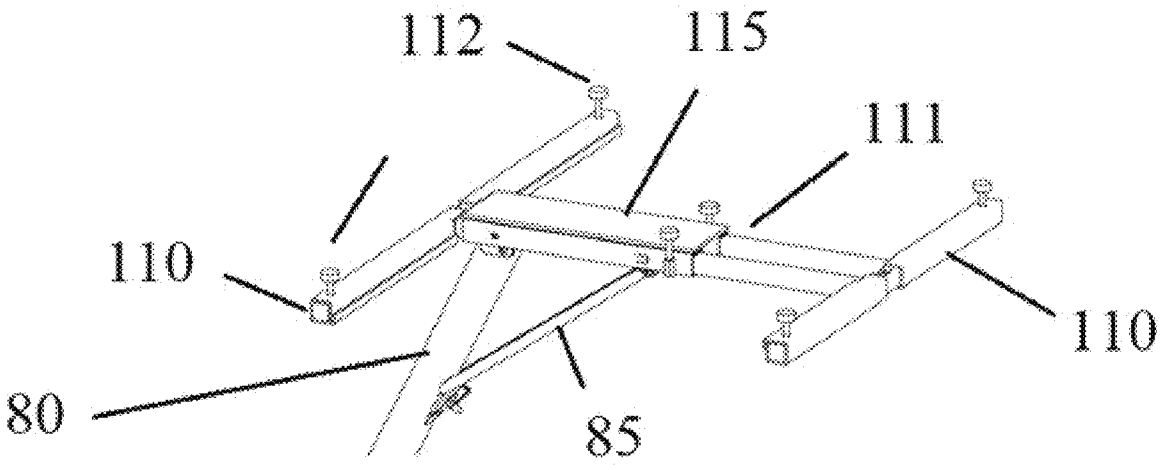
FIGS. 25A, 25B and 25C shows the bars of the "H: bracket
Figure 25B:
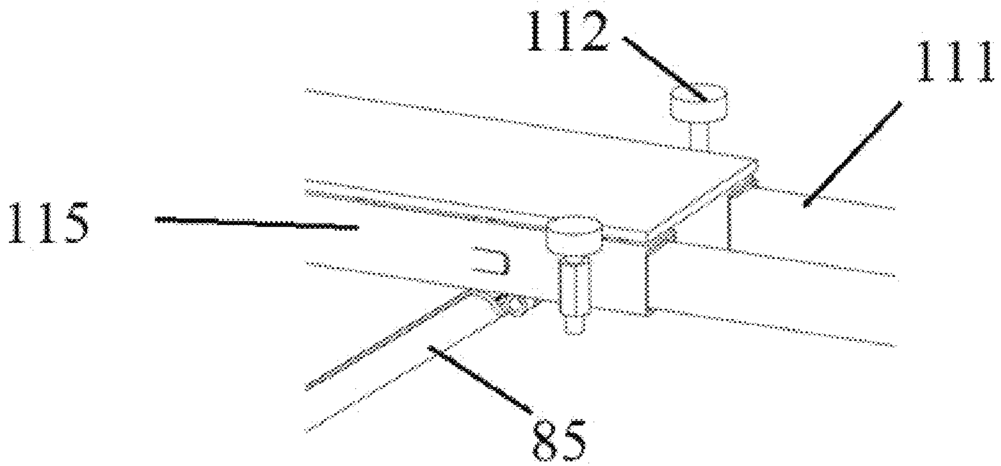
Figure 25:
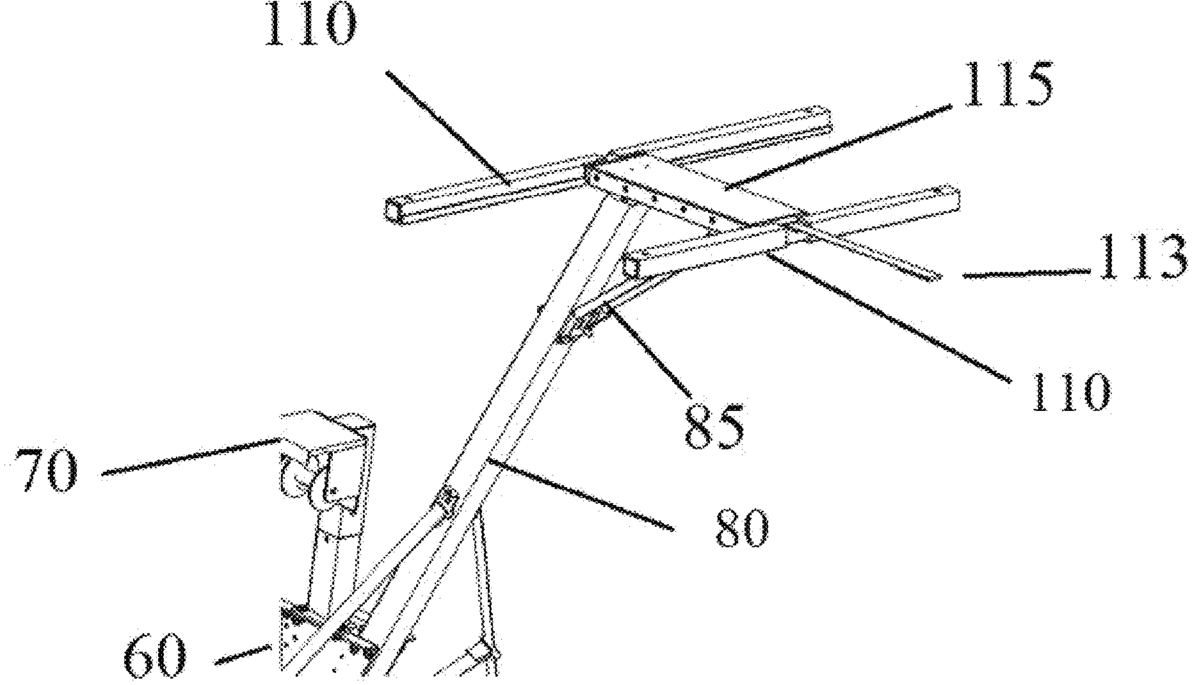

FIGS. 25A, 25B and 25C shows a close up view two lift support bars 110 and the central bar 115 of the "H: bracket. The central bar 115 has a telescoping slider 111 which is used to set the length of the central bar 115 to allow the "H" bracket match the width of the hardtop 200. Pins 112 can be used to secure and fix the length of the central bar 115. Pins 112 can also be used and the lift support bars 110 to hold cables or connection means to hold the clamps 500 or other hardtop holding means. FIGS. 25A, 25B and 25C shows the embodiment with a central bar extender 113.

Figure 26A:
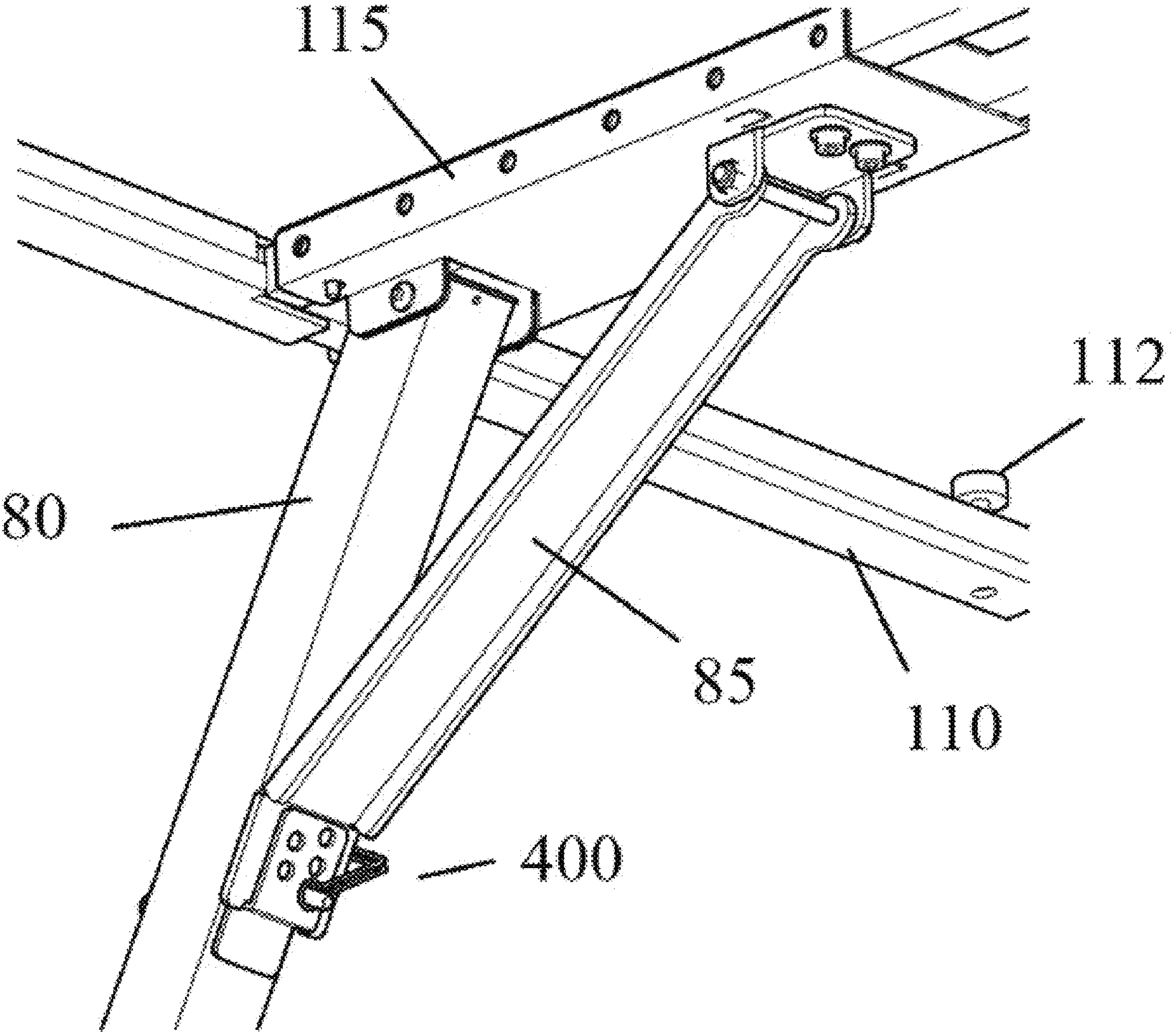
FIGS. 26A, 26B and 26C show close ups of the locking pin and compression bracket.
Figure 26B:
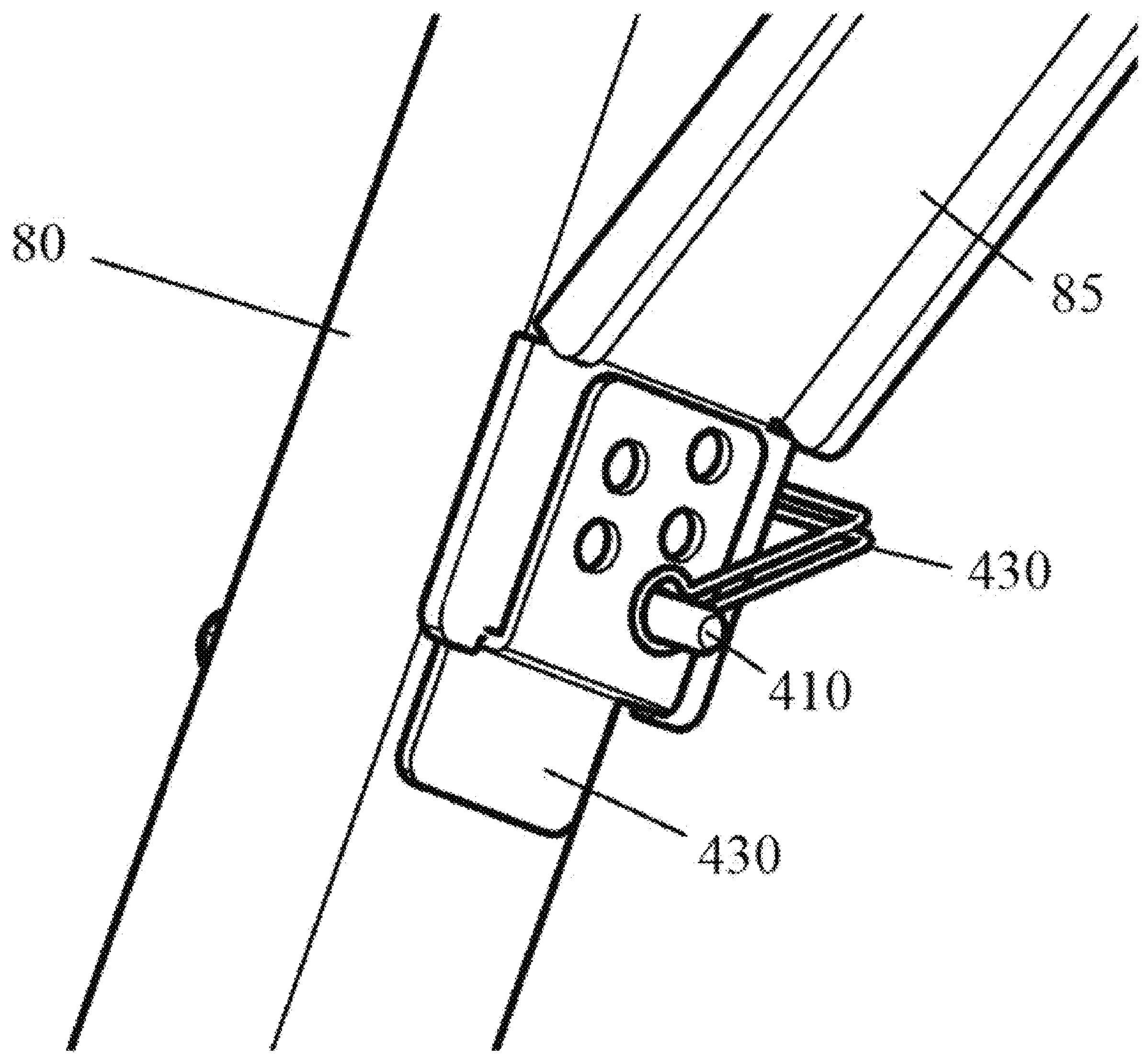
Figure 26C:
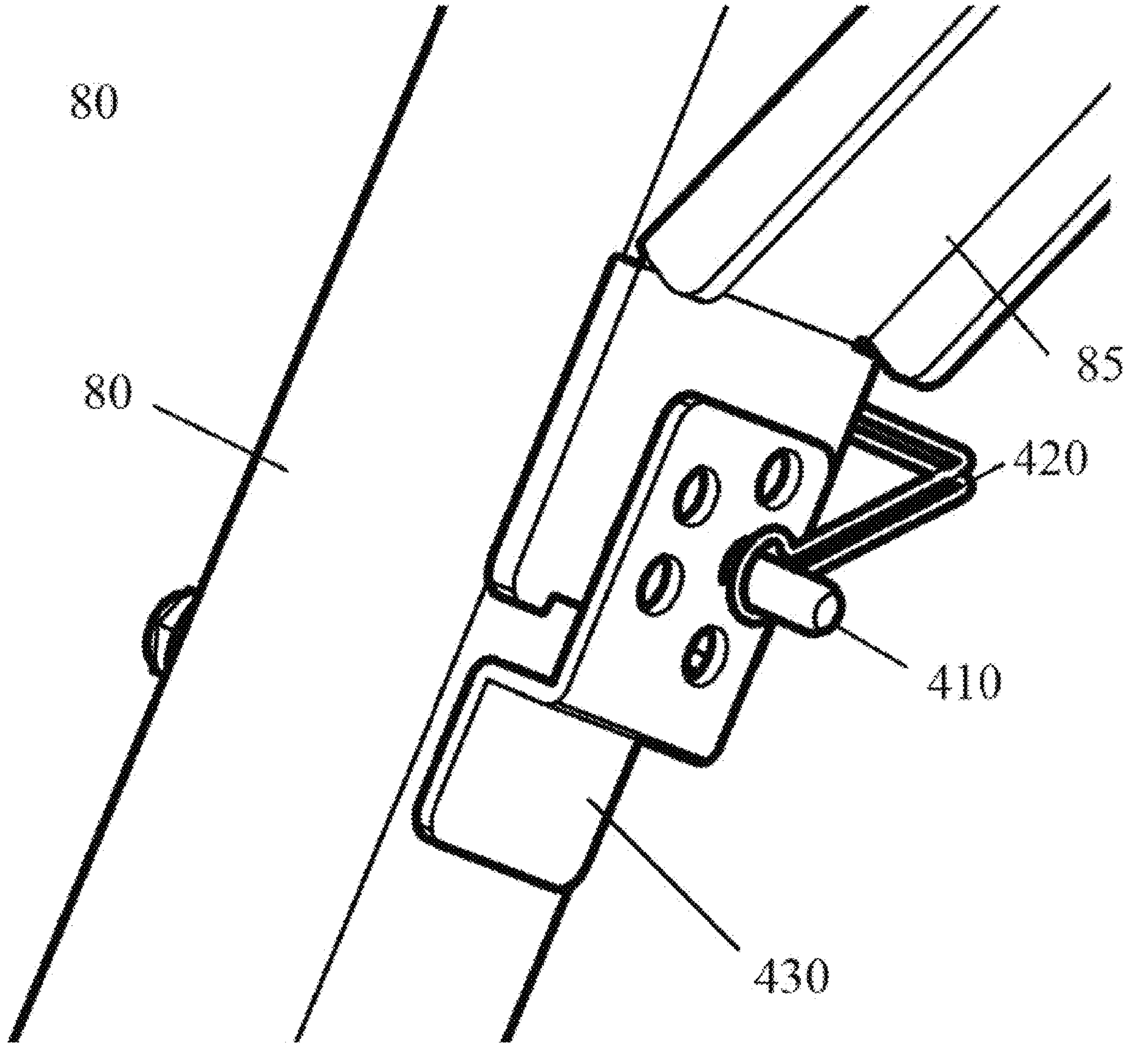

FIGS. 26A. 26B and 26C show close ups of the locking pin and compression brackets 400. FIG. 26A shows the angled control bar 85 attaching from the front of the support bar 80 to the central bar 115. FIG. 26A shows the locking pin 410 holding the angled control bar 85 in its position on the support bar **8*o* using openings in a faceplate 430. The locking pin 410 is held in place using a tension bracket 420. The tension bracket 420 loops around each end of the locking pin 410 to hold it in place. The locking pin 410 can be removed if not needed or moved to the appropriate hole in the faceplate 430 for the desired positioning of the angled control bar 85. FIG. 26B shows the locking pin 410 in a different position than FIG. 26C. In this embodiment the end of the angled control bar 85 has a hinged tab that slides into the faceplate 430 with the faceplate 430 is attached to the support bar 80 and angled out to allow the hinged tab to slide between the angled out part of the faceplate 430 and the support bar 80. In the preferred embodiment, the tension bracket 420 a material, such as a thick wire. that will hold its position but will allow the tension bracket 420 to hold the locking pin 410** in place.

Figure 27:
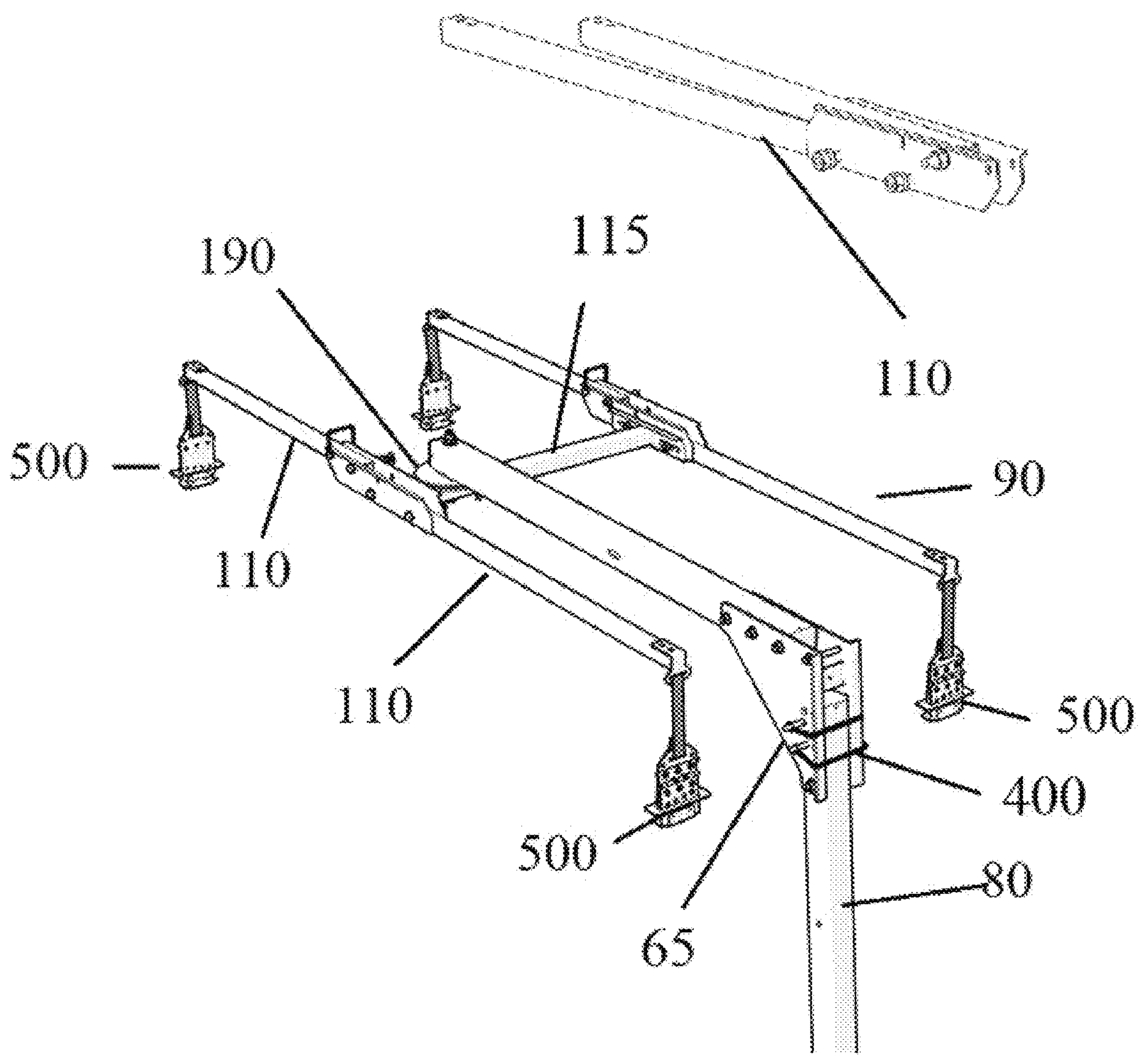
FIG. 27 shows the "H: bracket with clamps connected to the bars.
Figure 28:
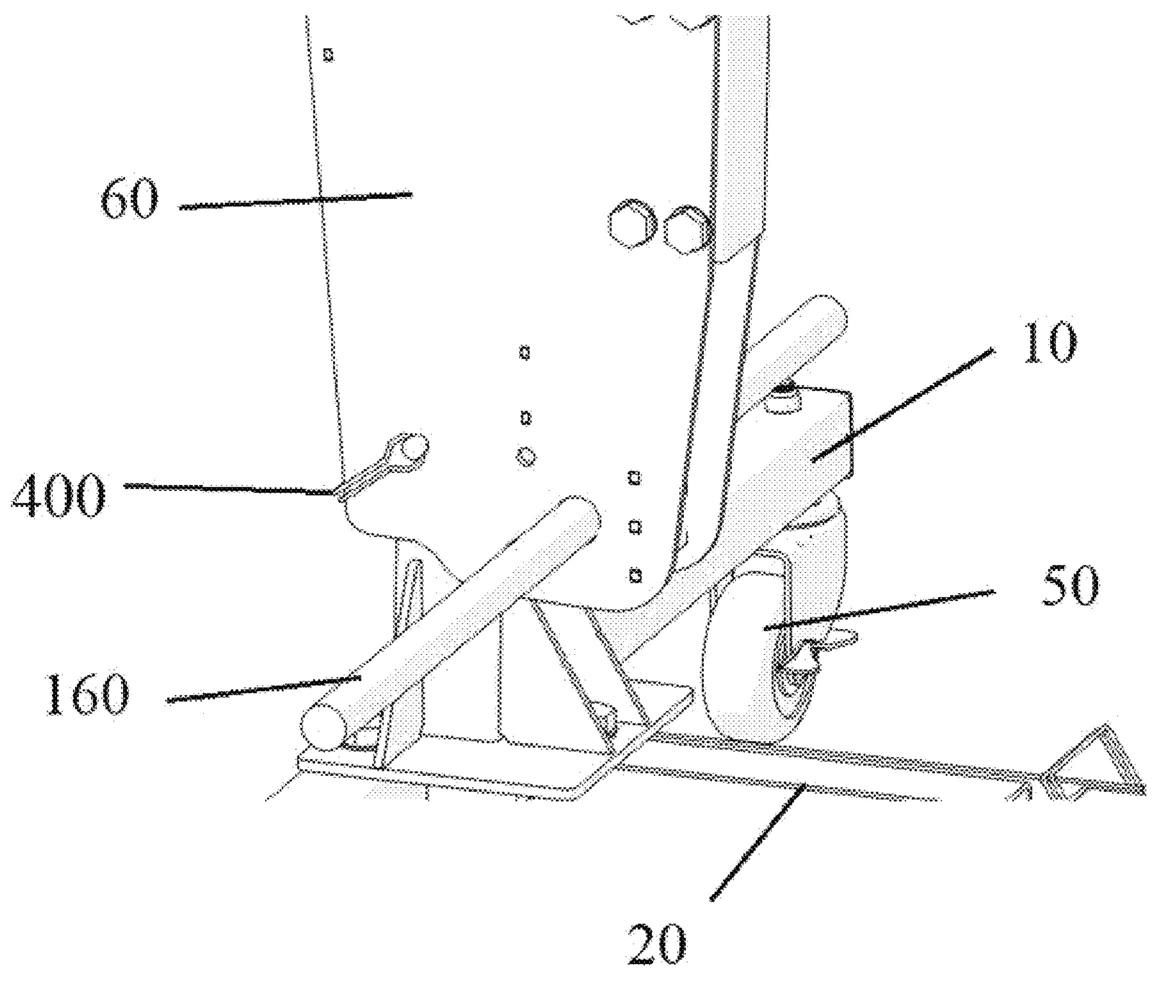
FIGS. 28A and 28B shows the base plate and base plate bar.
Figure 28:
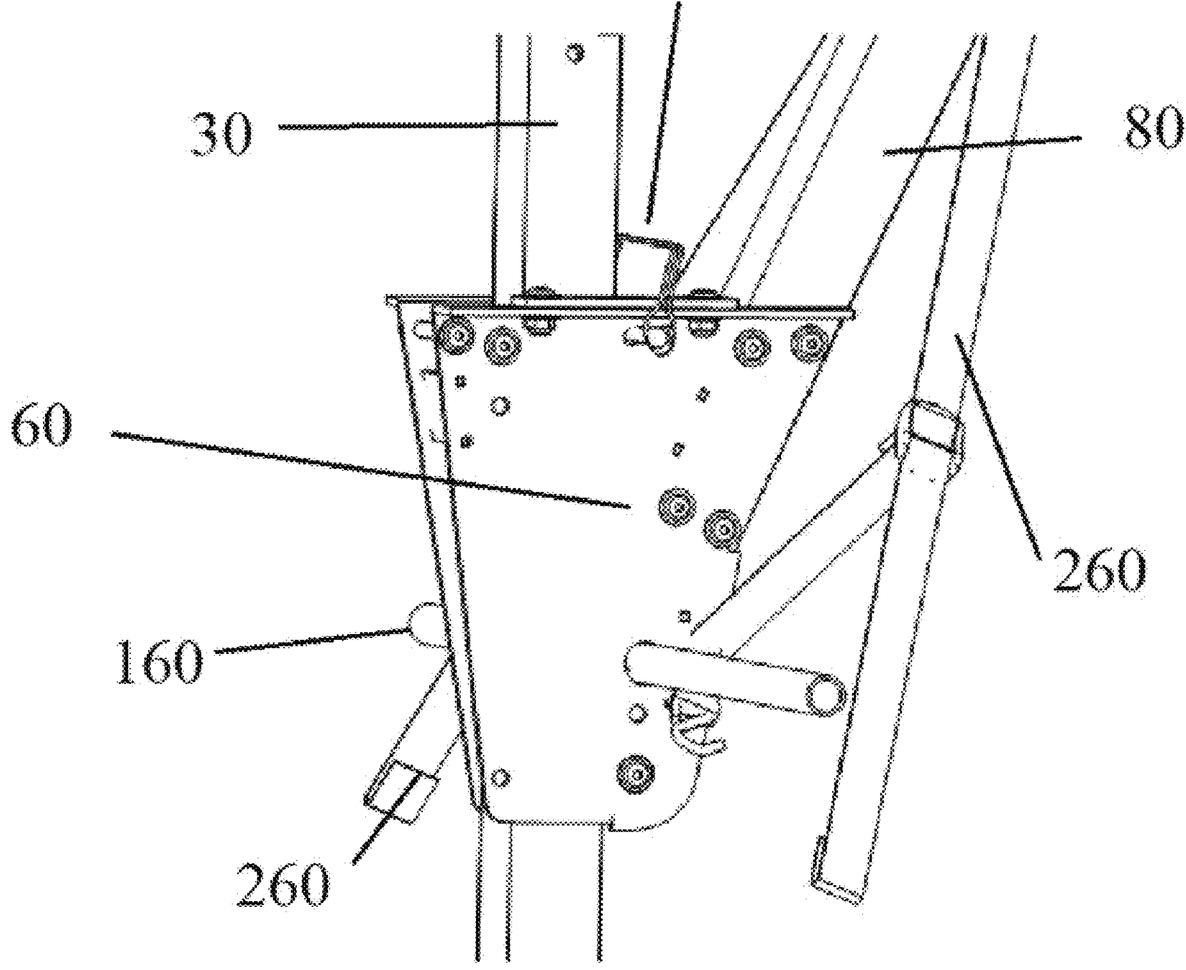

FIG. 27 shows the "H" bracket with clamps 500 connected to the lift support bars 110. Pins 112 can also be used and the lift support bars 110 to hold cables or connection means to hold the clamps 500. The lift support bars 110 show the hinge which allows the lift support brs 110 to be folded.

FIG. 28A shows the base plate 60 as well as the base plate bar 160. The base plate bar 160 extends from each side of the base plate 60 and is used to help direct the hardtop lifter 1 by hand or by foot. This allows for the ease of movement and positioning of the hardtop lifter 1.

The hardtop lifter 1 can have a handling bar 170 which serves a similar function to the base plate bar 160. In the preferred embodiment, the handling bar 170 is positioned on and extends from each side of the support pole 30 and is used to help direct the hardtop lifter 1. This allows for the ease of movement and positioning of the hardtop lifter 1. FIG. 28B show an other embodiment of the base plate 60 where the base place 60 is moved up the support pole 30 where the base plate 60 is in a different shape and has the base plate bar 160 with two support straps 260 that connect the support plate 60 to the support bar 80.

Figure 29A:
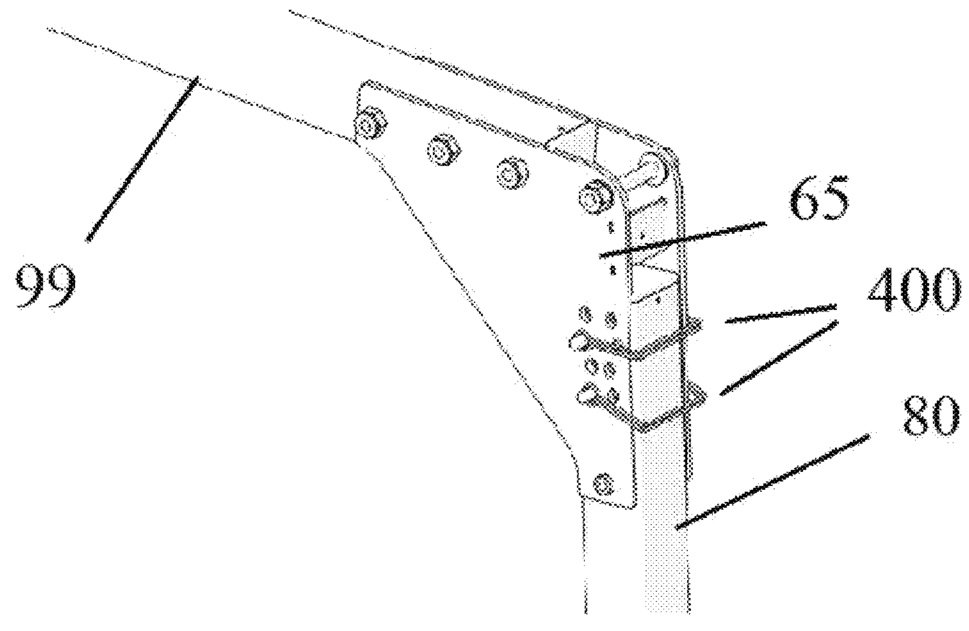
FIGS. 29A and 29B shows the lifter plate.
Figure 29B:
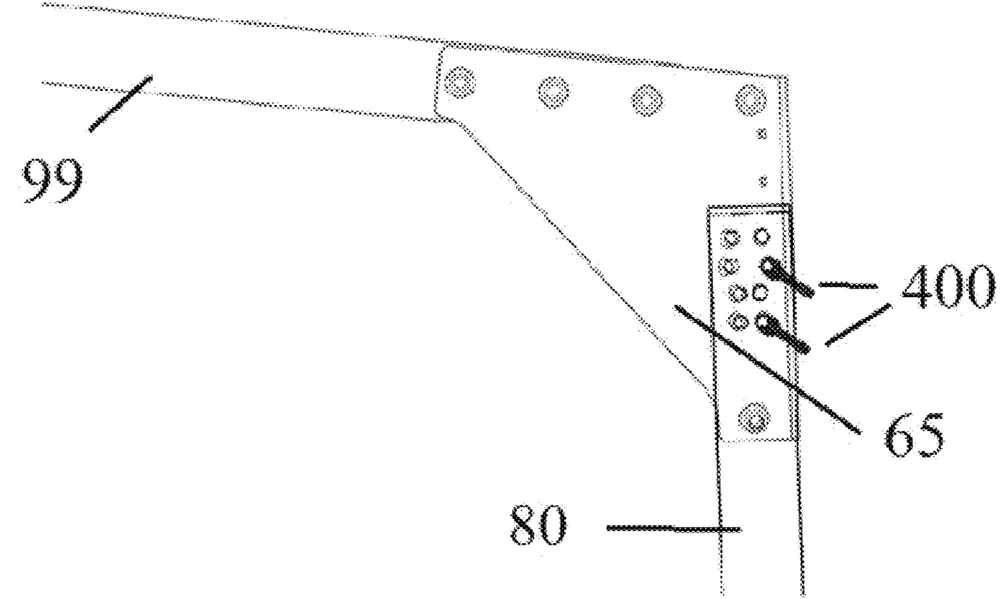

FIGS. 29A and 29B show shows the top of the support bar 80 with a support bar bracket 65 attached to the to the extender bar 99. The height of the extender bar 99 can be modified using latching pins 410. The latching pins 410 can easily be removed when the extender bar 99 is moved down into its folded position.

Figure 30:
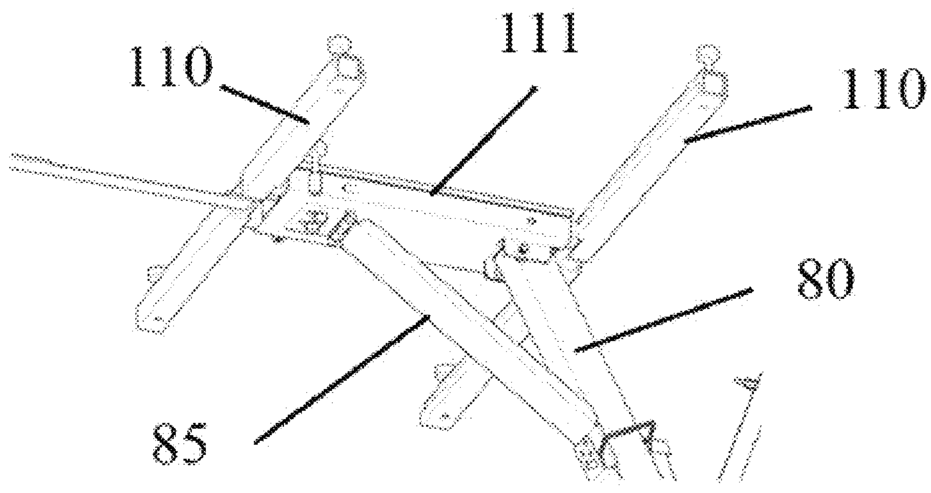
FIG. 30 shows upward view of the hardtop lifter.

FIG. 30 shows upward view of the "H" bracket.

Figure 31:
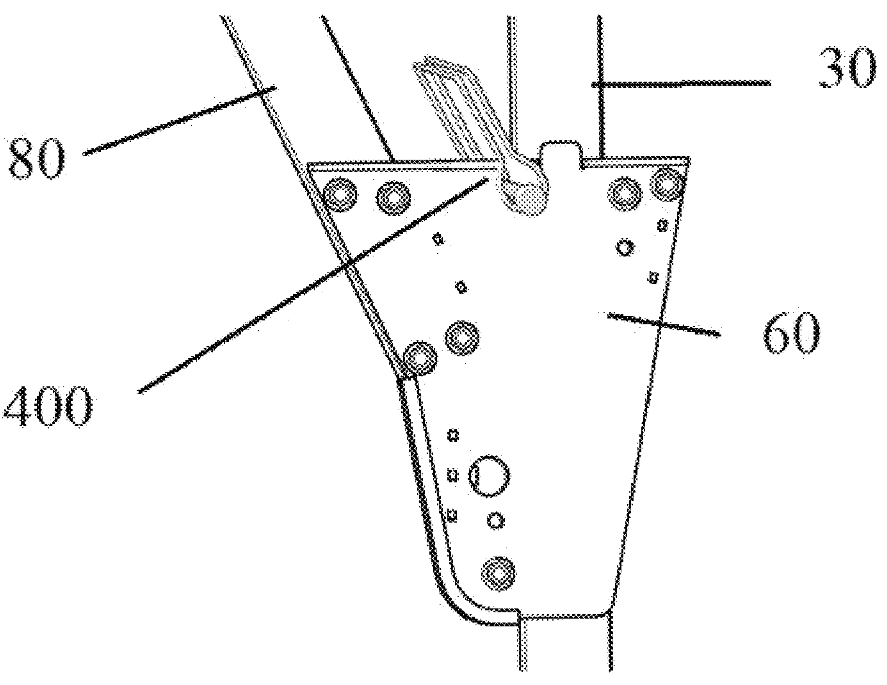
FIG. 31 shows a base plate embodiment.

FIG. 31 shows a bracket 60 embodiment. The lift bracket 60 is attached to the support pole 30 and can be moved up and down the support pole 30 which also moves the support bar 80.

Figure 32:
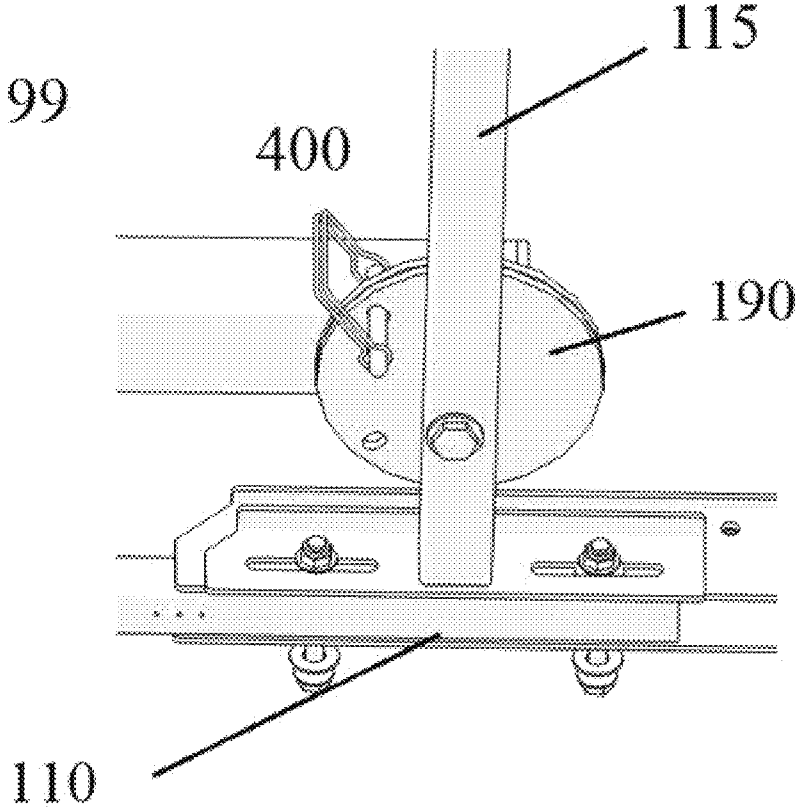
FIG. 32 shows the lifter turning plate.

FIG. 32 shows the pivotal connection 190 which allows the central bar 115 to swivel and move the "H" bracket into the needed position to lift the hardtop 200. The locking pin 410 is held in place using a tension bracket 420.

Figure 33:
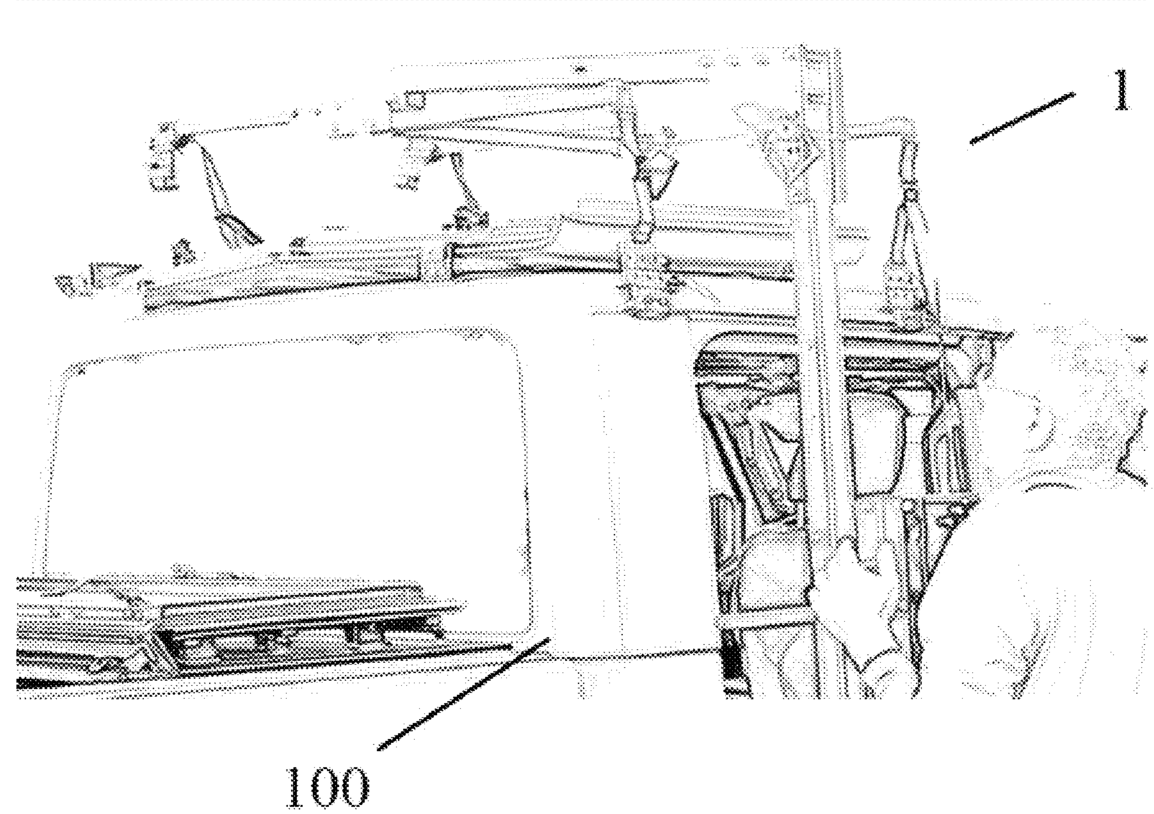
FIG. 33 shows the "H" bracket lifting being used with clamps.
Figure 34:
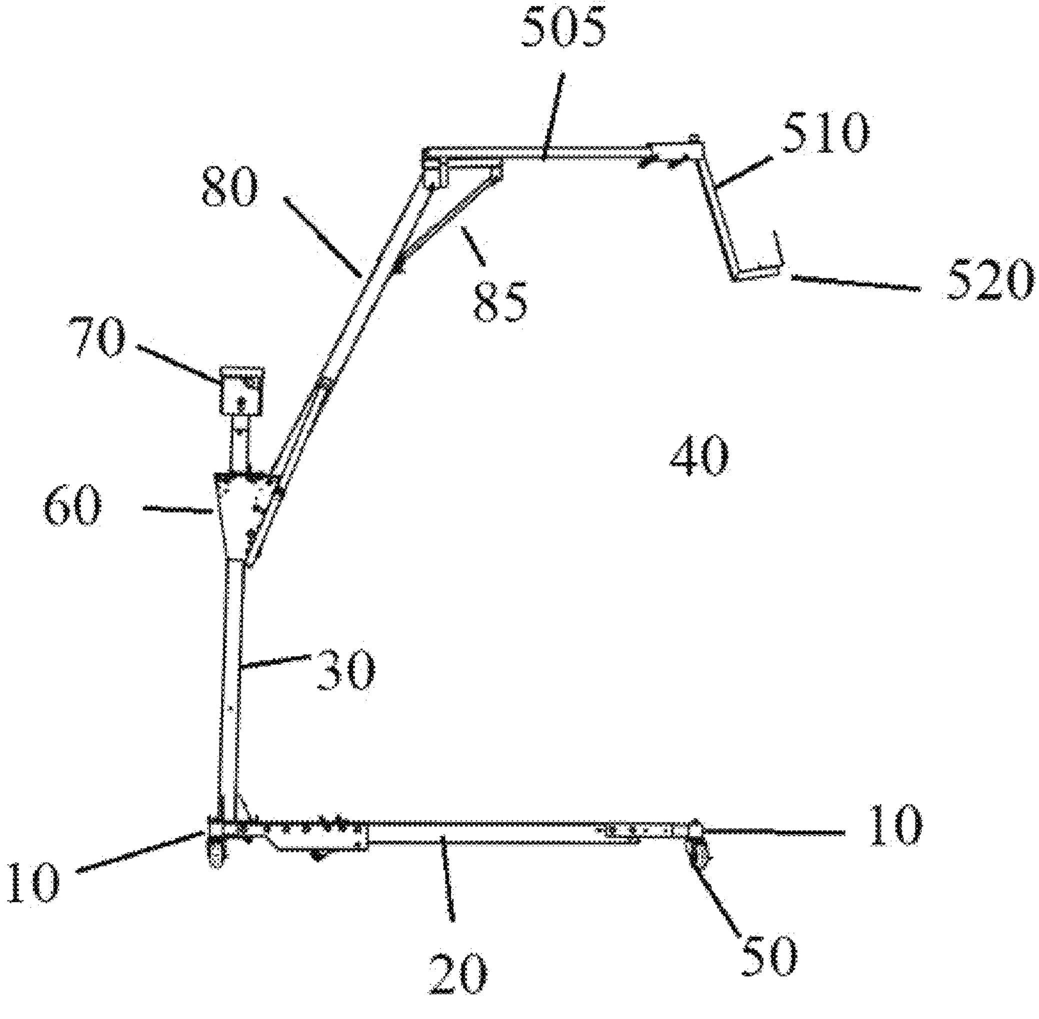
FIG. 34 shows the hardtop lifter with angled brackets.

FIG. 33 shows the "H" bracket lifting being to lift a hardtop 200 off of a vehicle 100 using clamps 500.

Figure 35:
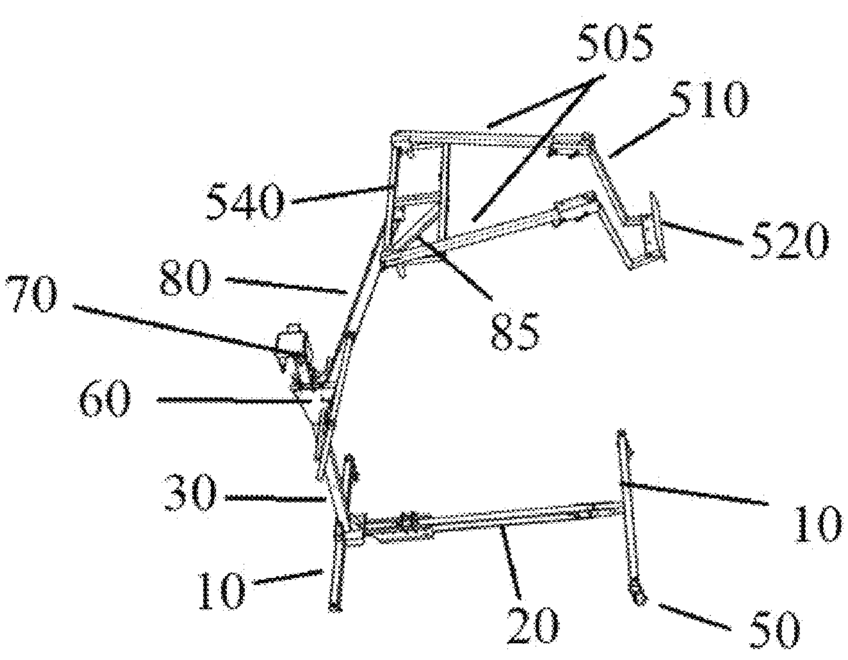
FIG. 35 shows a different view of the hardtop lifter with angled brackets.
Figure 36:
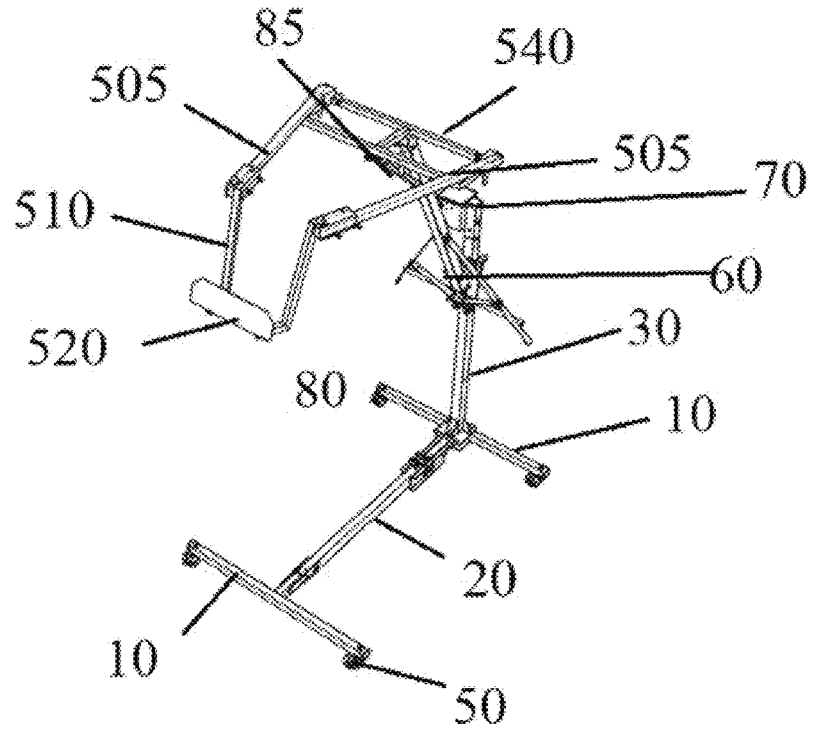
FIG. 36 shows another view of the hardtop lifter with angled brackets.
Figure 37:
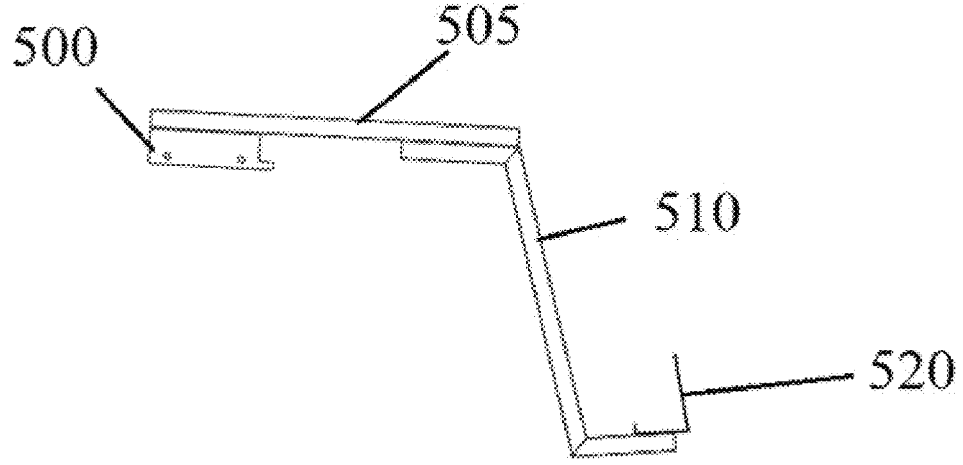
FIG. 37 shows a side view of the angled brackets.
Figure 38:
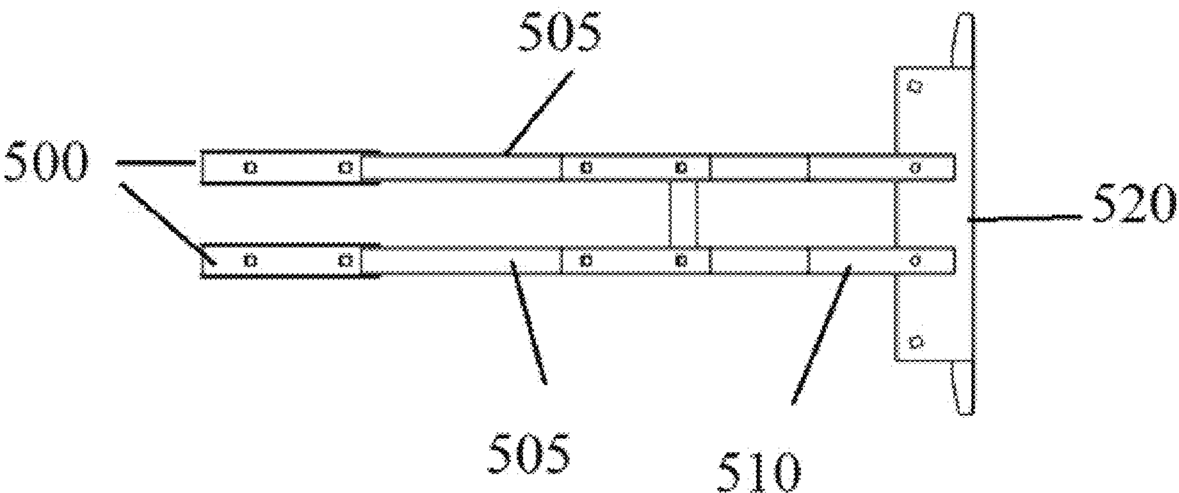
FIG. 38 shows a bottom view of the angled brackets.
Figure 39:
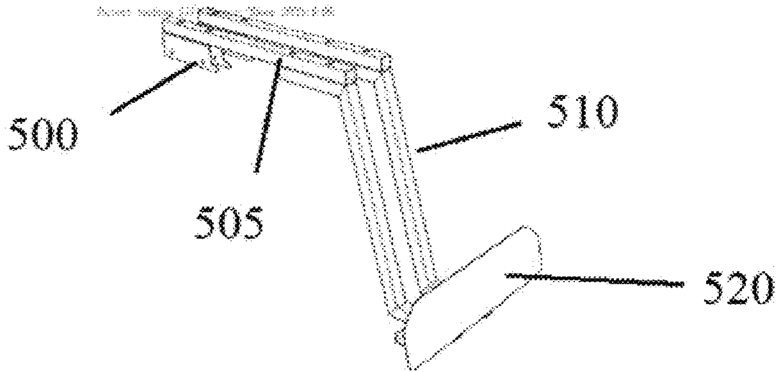
FIG. 39 shows an angled front view of the angled brackets.

FIGS. 35 through 41 shows the angled brackets embodiment. FIG. 35 shows the angled brackets on the base 2. The angled brackets consist of an angled base 540 that is connected to the support bar 80 and the angled control bar 85. Two angle support bars 505 extend forward from the angled base 540. Attached to the forward ends of the angle support bars 505 are angled securing bars 510. These angled securing bars 510 extend downward at an angle away from the angle support bars 505 and then extend straight out angled slightly upward in a shape similar to a capital "L". At the end of the angled securing bars 510 is the angled support shelf 520. The angled support shelf 520 is connected to the distal end of the two angled securing bars 510. The angled support shelf 520 has a flat floor surface that runs between the two angled securing bars 510 and a wall that extends up from the floor which forms a space between the angled securing bars 510 and the angled support shelf 520. This space can used to hold the hardtop 200. The angled support shelf 520 can extend out from the angled securing bars 510. The angled support shelf 520 wall can have rounded top edges and can extend out more than the angled support shelf 520 floor.

Figure 40:
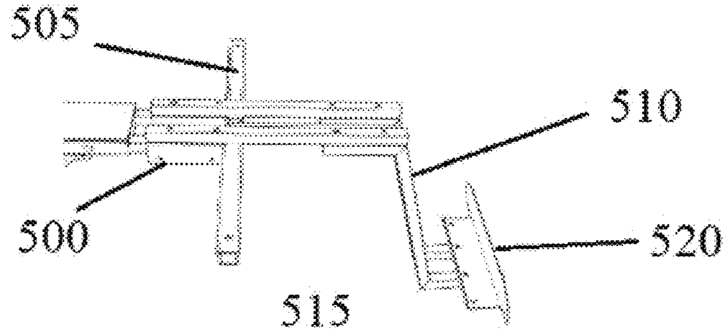
FIG. 40 shows top angled view of the angled brackets.
Figure 41:
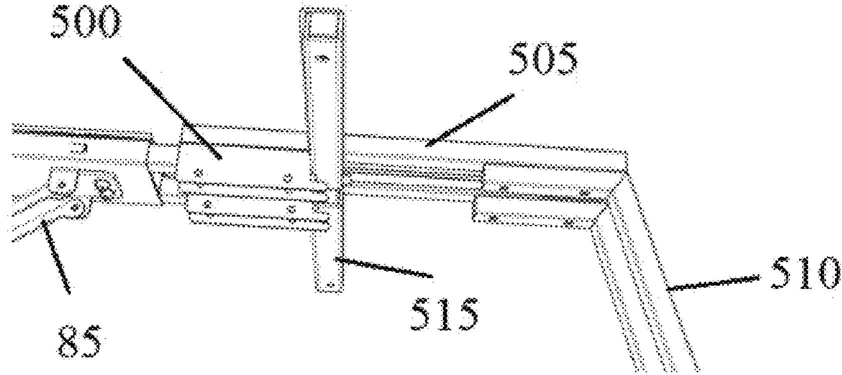
FIG. 41 shows a bottom angled view of the angled brackets with an angled cross bar.
Figure 42:
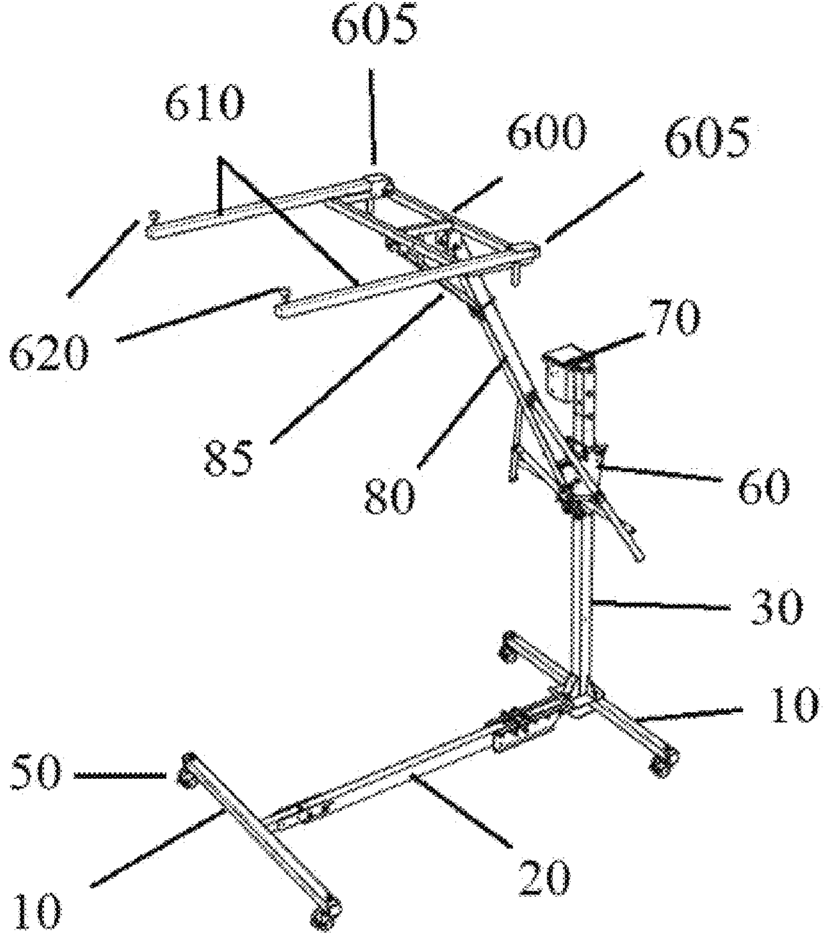
FIG. 42 shows the hardtop lifter with straight bar brackets.

The angled bracket may have an angled bracket plate 501 which attaches to a version of the angled base 540 and connected to the angle support bars 505. The angled bracket plate 501 may have a lip which supports an angled cross bar 530. The angled cross bar 530 runs perpendicular to the angle support bars 505 and can extend pass them as shown in FIGS. 40 and 41. The angled cross bar 530 adds support and structural strength to the angled bracket configuration.

FIGS. 42 through 46 shows the hardtop lifter with straight bar brackets. The straight bar brackets have a straight bar base 600 which can consist of a rectangular base made of four bars with a cross bar. The straight bar base 600 is attached to the support bar 80 and the angled control bar 85. The straight bar brackets have two movable straight bars 610 which are attached to the top of the straight bar base 600. The straight bars 610, in the preferred embodiment, are attached to and can pivot sideways on straight bar pivots 605. The straight bar pivots 605 are positioned in the top back corners of the straight bar base 600. The straight bars 610 may have tabs at the proximal end that extend downward that can be used to assist in pivoting and controlling the straight bars 610.

In the preferred embodiments, at the distal ends of the straight bar 610 are nubs 620. The nubs 620 extend out from the top of the straight lar 610 and used to secure the hardtops 200 while lifting. In the preferred embodiment, the nob 620 are mushroom shape and made of a strong soft material like rubber or plastic as to not damage the hardtop 200.

Figure 43:
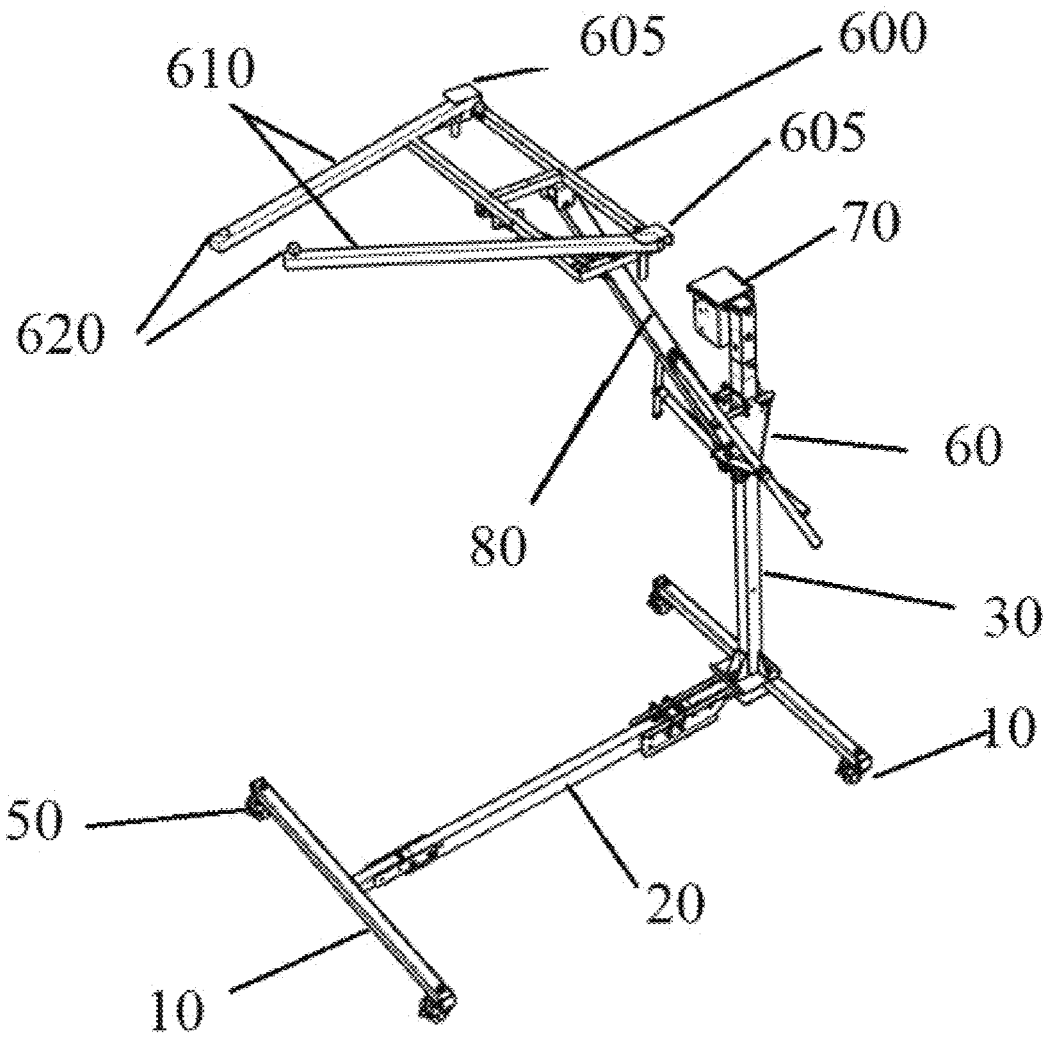
FIG. 43 shows the hardtop lifter with straight bar brackets being turned on the straight bar pivots.
Figure 44:
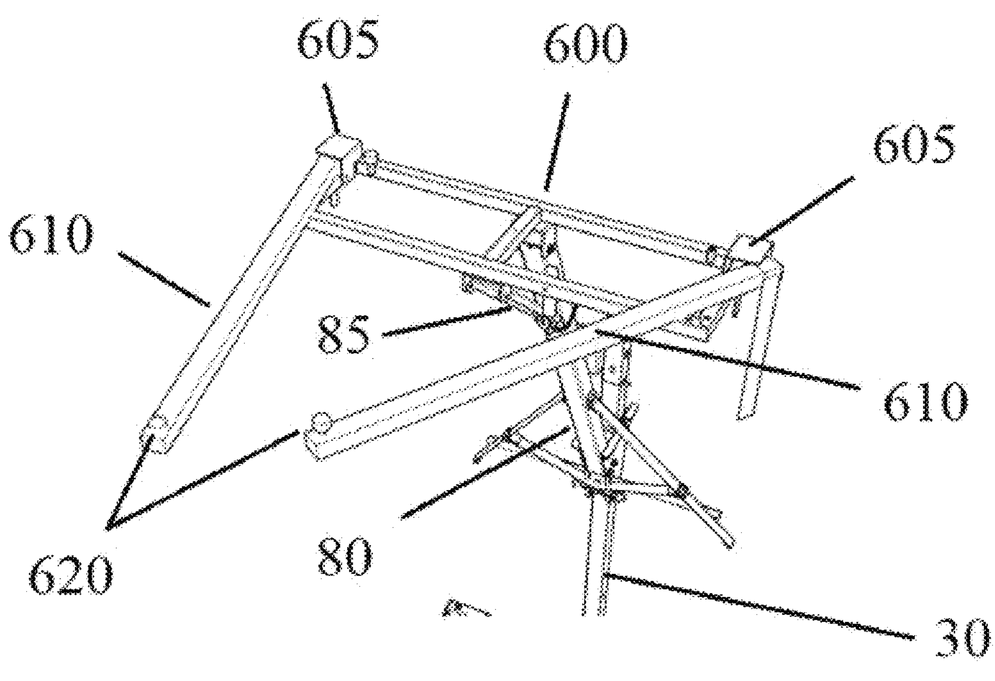
FIG. 44 shows the straight bar brackets being turned on the straight bar pivots.
Figure 45:
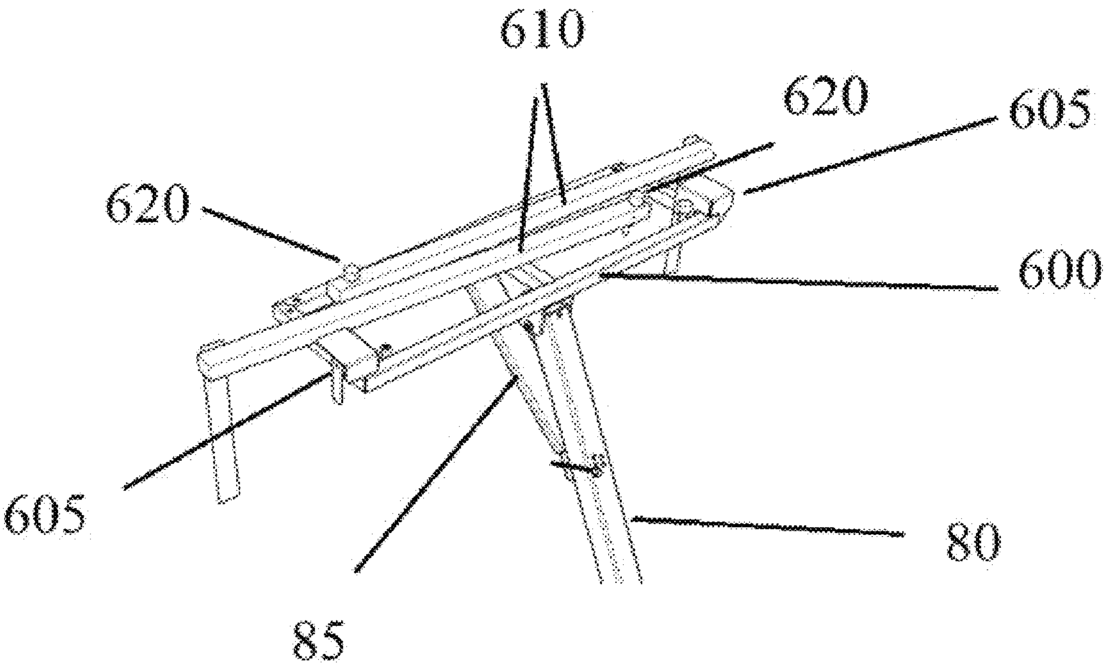
FIG. 45 shows the straight bar brackets in a folding position.
Figure 46:
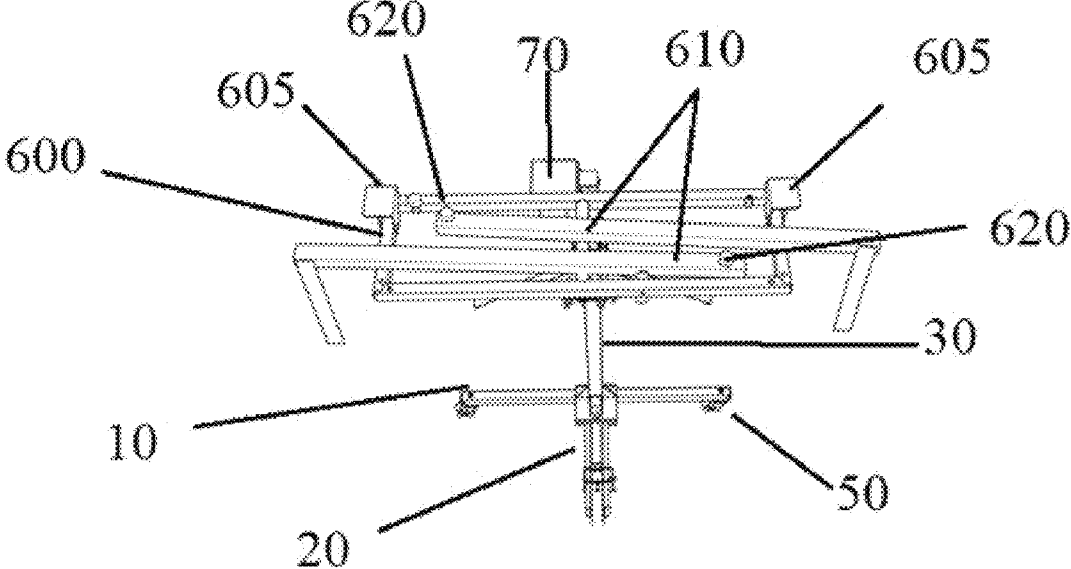
FIG. 46 is a top view of the straight bar brackets in a folding position.

FIGS. 43 and 44 show the hardtop lifter with straight bars 610 being turned on the straight bar pivots 605. As with the base 2, the straight bar brackets can be folded as shown in FIGS. 45 and 46. The straight bars 610 can even be disconnected from the straight bar pivots 605.

Angled securing bars 510 can also be attached to the straight bars 610 if desired.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art.

What is claimed is:

1. A device comprising: a base and a lifting mechanism attached to said base where the base has a plurality of support bars connected by a support cross bar with a support pole extending from a support bar with a lift bracket which is attached to a lift means where the lift means moves the lift bracket up and down the support pole where a support bar extends up from the lift bracket to an "H" shaped bracket that is comprised of a central bar connected to an extender bar with a pivotal connection allowing the central bar to swivel having two lift support bars that are connected and are perpendicular to the central bar where the extender bar has a back and the extender bar is connected to and extends forward from the top of the support bar with a support bar bracket.

2. A device according to claim 1 further comprising: where the base has a plurality of wheels.

3. A device according to claim 1 further comprising: where the lift means can be one or more of a crank and pulley system, an electronic motor or hydraulic system.

4. A device according to claim 1 further comprising: where the support pole has a top and the lift means is positioned on the top of the support pole.

5. A device according to claim 1 further comprising: where a support bar extends up from the lift bracket to a hardtop bracket where the support bar is positioned above the base parallel with the support cross bar.

6. A device according to claim 5 further comprising: where the lift bracket has a front bracket attached to a back bracket by a plurality of parallel bracket connection bars with two front bars that extends out from the sides of where the front bracket with two back bars extends out from the back of the back bracket.

7. A device according to claim 1 further comprising: having a plurality of clamps at the ends of the lift support bars.

8. A device according to claim 1 further comprising: being foldable where the lift bracket is lowered on the support pole where the hardtop bracket pivots on the support bar where an angled control bar releases its connection from the hardtop bracket as the hardtop bracket is repositioned and pivoted to where it the hardtop bracket is almost parallel with the support bar.

9. A device according to claim 1 further comprising: where the central bar has a telescoping slider.

10. A device according to claim 9 further comprising: where pins can be used to secure and fix the length of the central bar.

11. A device according to claim 1 further comprising: having an angled control bar attached from the front of the support bar to the central bar.

12. A device according to claim 1 further comprising: where a locking pin holds the angled control bar in its the angled control position on the support bar using openings in a faceplate and held in place using a tension bracket.

13. A device comprising:

a base and a lifting mechanism attached to said base where the base has a plurality of support bars connected by a support cross bar with a support pole extending from a support bar with a lift bracket which is attached to a lift means where the lift means moves the lift bracket up and down the support pole being foldable where the lift bracket is lowered on the support pole where the hardtop bracket pivots on the support bar where an angled control bar releases the angled control bar connection from the hardtop bracket as the hardtop bracket is repositioned and pivoted to where the hardtop bracket is almost parallel with the support bar.

14. A device comprising:

a base and a lifting mechanism attached to said base where the base has a plurality of support bars connected by a support cross bar with a support pole extending from a support bar with a lift bracket which is attached to a lift means where the lift means moves the lift bracket up and down the support pole having an extending control bar.

15. A device comprising:

a base and a lifting mechanism attached to said base where the base has a plurality of support bars connected by a support cross bar with a support pole extending from a support bar with a lift bracket which is attached to a lift means where the lift means moves the lift bracket up and down the support pole where a support bar extends up from the lift bracket where an angled base connects angled brackets to the support bar and to an angled control bar.

16. A device according to claim 15 further comprising:

where the angle support bars extend forward from the angled base with angled securing bars attached to the forward ends of the angle support bars, the angled securing bars extend downward at an angle away from the angle support bars and then extend straight out angled slightly upward, whereas at the end of the angled securing bars is an angled support shelf.

17. A device comprising:

a base and a lifting mechanism attached to said base where the base has a plurality of support bars connected by a support cross bar with a support pole extending from a support bar with a lift bracket which is attached to a lift means where the lift means moves the lift bracket up and down the support pole where a straight bar base is attached to the support bar and an angled control bar where the straight bar brackets have two movable straight bars which are attached to the top of the straight bar base, the straight bars are attached to and can pivot sideways on straight bar pivots, the straight bar pivots are positioned in the top back corners of the straight bar base.

18. A device comprising:

a base and a lifting mechanism attached to said base where the base has a plurality of support bars connected by a support cross bar with a support pole extending from a support bar with a lift bracket which is attached to a lift means where the lift means moves the lift bracket up and down the support pole having a handling bar extending from each side of the support pole.

19. A device comprising:

a base and a lifting mechanism attached to said base where the base has a plurality of support bars connected by a support cross bar with a support pole extending from a support bar with a lift bracket which is attached to a lift means where the lift means moves the lift bracket up and down the support pole where a locking pin holds the angled control bar in the angled control bar position on the support bar using openings in a faceplate and held in place using a tension bracket.

* * * * *